US011483310B1

(12) United States Patent
Al-Saggaf

(10) Patent No.: US 11,483,310 B1
(45) Date of Patent: Oct. 25, 2022

(54) POST-QUANTUM BIOMETRIC TEMPLATE PROTECTION SYSTEM USING SMART CARD

(71) Applicant: KING FAHD UNIVERSITY OF PETROLEUM AND MINERALS, Dhahran (SA)

(72) Inventor: Alawi Abdulrahman Al-Saggaf, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/741,980

(22) Filed: May 11, 2022

(51) Int. Cl.
*H04L 9/40* (2022.01)
*G06N 7/02* (2006.01)

(52) U.S. Cl.
CPC ......... *H04L 63/0861* (2013.01); *G06N 7/02* (2013.01); *H04L 63/0853* (2013.01)

(58) Field of Classification Search
None
See application file for complete search history.

(56) References Cited

U.S. PATENT DOCUMENTS

| | | | | |
|---|---|---|---|---|
| 2013/0318361 | A1* | 11/2013 | Erickson | G06F 21/6245 713/193 |
| 2014/0317715 | A1 | 10/2014 | Conner et al. | |
| 2020/0162455 | A1* | 5/2020 | Lin | H04W 12/47 |

FOREIGN PATENT DOCUMENTS

| | | |
|---|---|---|
| EP | 1 149 475 B1 | 12/2003 |
| WO | 2020/157520 A1 | 8/2020 |

OTHER PUBLICATIONS

Arjona (Arjona et al, "A Post-Quantum Biometric Template Protection Scheme Based on Learning Parity With Noise (LPN) Commitments", IEEE Access, vol. 8; Oct. 2020; cited in applicant's IDS), (Year: 2020).*

Pang (Pang et al., "Biometric System-on-Card", Encyclopedia of Biometrics, DOI 1031007/978-3-642-27733-7_9136-1, 2014), (Year: 2014).*

(Continued)

*Primary Examiner* — Piotr Poltorak
(74) *Attorney, Agent, or Firm* — Oblon, McClelland, Maier & Neustadt, L.L.P.

(57) ABSTRACT

A smart card system, method, and non-transitory computer readable medium for biometric template protection are described. The smart card system includes a server, a smart card, and a biometric probe. The biometric probe is configured to record a biometric trait. The smart card includes at least one memory configured to store program instructions, a contact pad configured to interface with the biometric probe to receive the biometric trait, and a microprocessor configured to receive the biometric trait. The microprocessor is configured to execute the program instructions to extract a biometric reference template, $t_r$, from the biometric trait. Further, the microprocessor stores the biometric template, $t_r$, in the memory, and protects the biometric template with a lattice-based post-quantum fuzzy commitment.

16 Claims, 15 Drawing Sheets

(56) References Cited

OTHER PUBLICATIONS

Armoogum (Armoogum et al., "A practical approach for secure biometric template storage for authentication", 2016 IEEE International Conference of Emerging Technologies and Innovative Business Practices for the Transformation of Societies (EmergiTech), IEEE 978-1-5090-0706-6/16), (Year: 2016).*

Chaudhary (Chaudhary et al., "Lattice-Based Public Key Cryptosystem for Internet of Things Environment: Challenges and Solutions", IEE Internet of Things Journal, vol. 6, No. 3, Jun. 2019). (Year: 2019).*

Ouda, et al.; Fuzzy Commitment Scheme for Masked Iris Codes; International Journal of Computer Applications, vol. 79—No. 11; Oct. 2013; 6 Pages.

Kolberg, et al.; Post-Quantum Secure Two-Party Computation for Iris Biometric Template Protection; IEEE; Dec. 6-11, 2020; 3 Pages.

Arjona, et al.; A Post-Quantum Biometric Template Protection Scheme Based on Learning Parity With Noise (LPN) Commitments; IEEE Access, vol. 8; Oct. 16, 2020; 11 Pages.

Duong-Ngoc, et al.; Efficient NewHope Cryptography Based Facial Security System on a GPU ; IEEE Access, vol. 8; Jun. 22, 2020; 11 Pages.

* cited by examiner

POST-QUANTUM BIOMETRIC TEMPLATE PROTECTION SYSTEM USING SMART CARD

STATEMENT REGARDING PRIOR DISCLOSURE BY THE INVENTORS

Aspects of this technology are described in an article "A Post-Quantum Fuzzy Commitment Scheme for Biometric Template Protection: An Experimental Study", published by IEEE Access, Volume: 9, pp 110952-110961, on Jul. 28, 2021, which is incorporated herein by reference in its entirety.

STATEMENT OF ACKNOWLEDGEMENT

The inventor(s) acknowledge the financial support provided by the King Fand University of Petroleum and Minerals (KFUPM), Riyadh, Saudi Arabia, through Project #SR191031.

BACKGROUND

Technical Field

The present disclosure is directed to a post-quantum biometric template protection system using smart card.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Biometrics have been widely accepted and used across all sectors, ranging from individuals to government for identification, security, and such other purposes. A biometric authentication system authenticates a user by receiving, analyzing, and comparing a biometric trait of a person with a stored biometric data of the user. Based on the authentication, the biometric authentication system allows the authorized person to enter the premises of an organization, building, etc. Biometrics is a promising authentication means that provides some superior features. For example, it cannot be lost or forgotten, is user-friendly, convenient, and secure. A conventional biometric authentication system works in two stages: enrollment of the user and authentication of the enrolled user. In the enrollment stage, a biometric reference template is extracted from the biometric trait and stored on a server. During the authentication stage, the biometric trait is again received from the user, and a biometric probe template is extracted from the received biometric trait. The biometric authentication system computes a matching score between the stored biometric reference template and the extracted biometric probe template. The biometric authentication system authenticates the user if the matching score is above a predefined threshold range. Despite the advantages of biometrics, the adoption of biometrics in an unprotected manner for authentication has raised several significant security and privacy concerns. Firstly, the stored biometric reference template can be replaced by an attacker template. Secondly, the stored biometric reference template can be easily stolen or can be used to gain unauthorized access during the matching process.

To overcome the limitations of biometrics, several traditional fuzzy cryptography primitives such as fuzzy commitment, fuzzy vault, and fuzzy extractor techniques have been developed to protect the biometric reference template, thereby mitigating security and privacy issues associated with the stored biometric reference template.

A fuzzy commitment (FC) consists of a helper data and a hash value of a secret key. The helper data is obtained by combining the biometric reference template and a codeword of the secret key. The helper data and the hash value of the secret key are stored as a fuzzy commitment. To release the secret key, the biometric probe template is combined with the helper data to construct a corrupted codeword, which is further decoded using an error-correcting code (ECC) to obtain the secret key. However, it is evident that an FC is also prone to leakage of information concerning the secret keys, in a manner similar to the biometric template. The helper data is prone to statistical attacks. Due to the use of the ECC, which bonds to split parts of the biometric template, the accuracy performance of the protected biometric system using the FC is poorer than the unprotected biometric system. Based on the aforementioned discussion, the security of the FC relying on ECC, downgrades its security and privacy, as well as its accuracy.

Accordingly, it is one object of the present disclosure to provide a secure template protection system for a smart card.

SUMMARY

In an exemplary embodiment, a method for biometric template protection is described. The method includes storing a biometric template on a smart card. The method further includes protecting the biometric template with a lattice-based post-quantum fuzzy commitment.

In another exemplary embodiment, a smart card system is described. The smart card system includes at least one memory located in a smart card, wherein the memory is configured to store program instructions; a biometric probe configured to record a biometric trait; a contact pad located on the smart card, wherein the contact pad is configured to interface with the biometric probe to receive the biometric trait; a microprocessor located in the smart card and connected to the at least one memory, wherein the microprocessor is configured to receive the biometric trait, wherein the microprocessor is configured to execute the program instructions to: extract a biometric reference template, $t_r$, from the biometric trait; store the biometric template, $t_r$, in the memory; and protect the biometric template with a lattice-based post-quantum fuzzy commitment.

In another exemplary embodiment, a non-transitory computer readable medium embodied within a smart card, the non-transitory computer readable medium having instructions stored therein that, when executed by one or more processors, cause the one or more processors to perform a method for biometric template protection is described. The method includes storing a biometric template; and protecting the biometric template with a lattice-based post-quantum fuzzy commitment.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
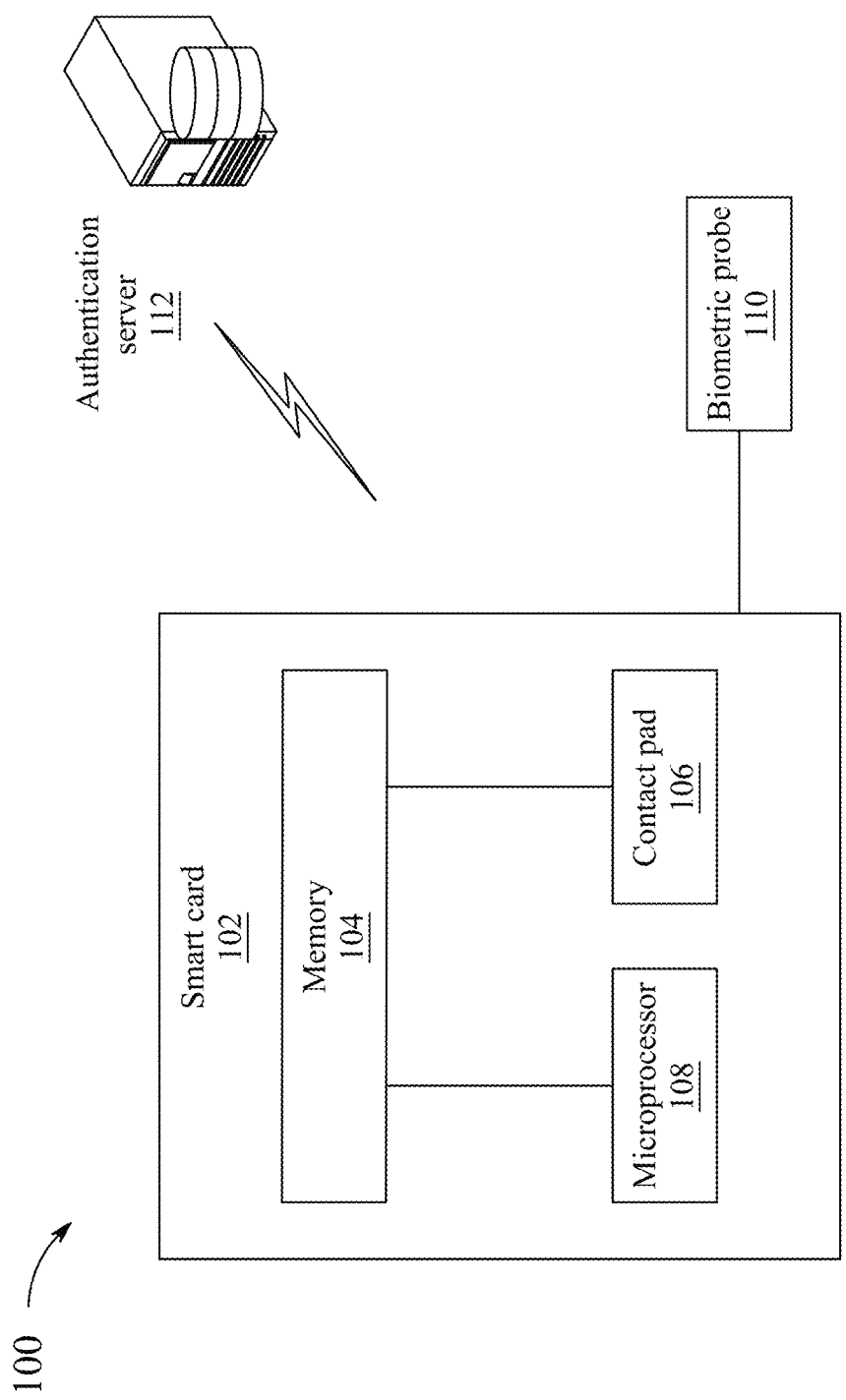
FIG. 1 illustrates a smart card system, according to aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed towards a smart card system and a method for biometric template protection. The disclosure also provides a post-quantum fuzzy commitment (PQFC) for biometric template protection, which is more secure than conventional biometric protection methods. The disclosed PQFC is based on a Short Vector Problem (SVP) of a lattice. The present disclosure provides a systematic construction of biometric template protection that does not rely on error-correcting codes (ECC). Based on the biometric-based PQFC authentication system of the present disclosure, a smartcard is designed in which the biometric template is protected by the PQFC. Furthermore, in the present disclosure, biometric matching is performed indirectly, thereby increasing the safety of the information stored in the system and the smart card. The biometric-based PQFC authentication system was compared to an iris database of 108 individuals. According to the experimental data, the accuracy of iris recognition with the PQFC is 99.1 percent, which is higher than the accuracy of a conventional system without PQFC, which is 97.4 percent. In the system of the present disclosure, a False Accepting Rate (FAR) of 0% is achieved, while the False Rejection Rate (FRR) is 2.9%. The execution time for the essential operations of PQFC and the storage requirements are also estimated. Furthermore, the security of the authentication system was analyzed, showing that the renewability, unlinkability, and irreversibility of the ISO/IEC 24745 standard are fulfilled without downgrading the accuracy of the system. The overall performance of the method demonstrated that the PQFC is a promising technique for biometric template protection that is also suitable for the Internet of Things and cloud computing applications.

In the present disclosure, definitions of one or more terms that will be used in the document are provided below.

The term "bit commitment" may be defined as an encryption of a bit of data, such as generating a hash of the bit. To commit a bit, the user chooses a random "witness" and computes a function including the bit and the witness. The receiver opens the bit by knowing the witness.

The term "fuzzy commitment" may be defined as a method in which a cryptographic key is decommited using a biometric data. In a fuzzy commitment, an offset is included, which translates an input pattern. A receiver can open the bit with an approximate witness (fuzzy).

The term "commitment" refers to a cryptographic technique that allows one to commit to a chosen value (or chosen statement) while keeping it hidden from others, with the ability to reveal the committed value later. In the commitment, a party cannot change the value or statement after they have committed to it; that is, the commitment is binding. It refers to inserting the commitment of a bit string c (or other potentially non-binary value) into a single blob (Binary Large Object), and for which it is possible to extract bit string c efficiently given a witness for the blob.

FIG. 1 illustrates a block diagram of a smart card system 100 (hereinafter interchangeably referred to as "the system 100"), according to one or more aspects of the present disclosure.

Referring to FIG. 1, the system 100 includes a smart card 102, a biometric probe 110, and an authentication server 112. The smart card 102 includes at least one memory 104, a contact pad 106, and a microprocessor 108. In some examples, the smart card 102 is a card with embedded integrated circuits that include the microprocessor 108 and the memory 104. The smart card 102 may provide identification, authentication, data storage, and application processing, as well as serve as a credit card or debit card, phone or fuel card, card-type electronic passport, secure tamper-resistant smart card, and a high-security access-control (identification card) card for granting access to a building or computer. The smart card 102 may be employed in an authentication process for authenticating the identity of the user. In examples, the authentication process may be conducted in a variety of ways, including through the use of a pin, password, or biometric authentication, or a combination of methods for added layers of security.

The memory 104 is configured to store program instructions for performing biometric template protection. The memory 104 provides storage of instructions and data for executing the functionality of the various components of the smart card 102. The memory 104 may also be configured to store lattice-iris vector based on the registration of a user. The memory 104 may also store a unique identification number corresponding to the smart card 102. In some examples, the memory 104 may store instructions for encryption and hashing functions for secure copying and transmission of the stored data. The memory 104 may be a semiconductor-based memory, such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM"). The memory 104 may include types of semiconductor-based memory, such as programmable read-only memory ("PROM"), erasable programmable read-only memory ("EPROM"), electrically erasable read-only memory ("EEPROM"), or flash memory. In some examples, the memory 104 may include any other removable storage media and communication interface, thereby allowing transfer of software and data from an external medium to the smart card 102. In some examples, the memory 104 may be encrypted based on encryption parameters securely and immutably stored therein.

The biometric probe 110 is configured to record at least one biometric trait from the user. For example, the at least one biometric trait is selected from a group including a fingerprint, a thumb print, a palm print, a retinal scan, an iris scan, a voice sample, a facial expression, or a combination thereof. In some examples, the biometric probe 110 is an iris scanner, a retinal scanner, a fingerprint scanner, a microphone, a facial scanner, a vein scanner, or a combination thereof. The biometric probe 110 is configured to communicate with the user during enrollment as well as during authentication. In example, the biometric probe 110 includes a plurality of sensors for taking a plurality of biometric traits from the user for verification purposes. In some examples, the biometric probe 110 may have a contact surface having the plurality of sensor elements embedded therein. The plurality of sensors may be arranged in one or more layers to provide a plurality of biometric readings from said user when said user is in contact with said biometric probe 110. For example, the biometric probe 110 may be a finger vein reader configured with an infrared light which is combined with an image capturing device. In some examples, the biometric probe 110 may be a palm reader configured with infrared light which is combined with the image capturing device. For example, the image capturing device is a camera.

The smart card 102 includes the contact pad 106. The contact pad 106 is configured to interface with the biometric probe 110 to receive the biometric trait taken from the user. The memory 104 is configured to store the received biometric trait. For example, the contact pad 106 acts as a connector interface for providing communication between the biometric probe 110 and the smart card 102. In examples, the contact pad 106 enables a wired connection or a wireless connection. For example, the contact pad 106 may include a serial port connector interface or a Universal Serial Bus (USB) connector interface.

The microprocessor 108 is commutatively connected to the at least one memory 104. The microprocessor 108 is configured to fetch the biometric trait stored in the memory 104. In communication with the memory 104, the microprocessor 108 is configured to execute the program instructions to extract a biometric reference template, $t_r$, from the biometric trait fetched from the memory 104. On executing the program fetched from the memory 104, the microprocessor 108 stores the extracted biometric template, $t_r$, in the memory 104. The microprocessor 108 is further configured to protect the biometric template, $t_r$, by employing a lattice-based post-quantum fuzzy commitment. In some examples, the biometric template is an iris template, a fingerprint template, a voice template, a finger vein pattern template, a palm template, and a facial template. The microprocessor 108 can be implemented as any electronic device capable of processing, receiving, or transmitting data or instructions. For example, the microprocessor 108 can be a microprocessor, a central processing unit (CPU), an application-specific integrated circuit (ASIC), a digital signal processor (DSP), or combinations of such devices.

In some examples, the system 100 includes an authentication terminal (not shown) which is configured to read the smart card 102. For example, the authentication terminal is a card reader that reads information recorded on the smart card 102, located at entrance/exit gate. The system 100 is configured to authenticate the user based on the biometric information acquired by the authentication terminal. In examples, the authentication terminal is a portable information terminal, a bank automatic teller machine (ATM), a credit card payment terminal, a kiosk terminal, or the like.

The system 100 is configured to operate in two modes. A first mode is an enrollment of the smart card 102 with the system 100, and a second mode is authentication of the enrolled smart card 102. During the enrollment mode, the biometric traits of the user, such as fingerprints, iris patterns, retinal patterns, facial recognition, voice recognition, and the like are captured using the biometric probe 110. The captured data for each biometric trait is then processed using a feature extractor algorithm and converted into a compact digital representation called a biometric reference template. For example, the feature extractor algorithm may be a computer vision algorithm, a deep neural network trained for feature extraction, or another type of feature extractor algorithm. These biometric reference template (s) are stored in the memory 104 of the smart card 102. In some examples, each biometric reference template has an associated digital signature, which is usually produced by the card's issuer, that links the template to the card ID. In examples, the biometric reference template (s) and the associated digital signatures are also stored in a server for backup and other purposes.

The smart card 102 is inserted into or tapped on the card reader in the authentication mode. In some examples, if the smart card 102 is a contactless smart card, then it is placed near to the card reader. The authentication server 112 is commutatively coupled with the smart card 102 via the authentication terminal (card reader) and the biometric probe 110. The authentication server 112 is configured to receive the information from the smart card 102 via the card reader and the biometric trait from the biometric probe.

In order to enroll the smart card 102 with the system 100, the authentication server 112 is configured to generate a random matrix, A, and transmit the random matrix to the smart card 102. The random matrix is given by:

$$A \in \mathbb{Z}_q^{n \times m},$$

where A represents m columns of n basis vectors, q is a prime number, n is an integer representing a number of columns in the matrix, and m is an integer representing a number of rows in the matrix.

In the system 100, $Z_q$ represents a field (q is a prime number) and $\mathbb{Z}_q^n$ is a vector space over $Z_q$. For mathematical implementation of the present system 100, the following definitions are described:

Definition 1: The distance metric between two vectors $u=(u_1, u_2, \ldots, u_n)$ and $u'=(u_1', u_2', \ldots, u_n')$ is defined as follows:

$$\delta(u, u') = \left(\sum_{i=1}^{n}(u_i - u_i')^2\right)^{1/2}. \quad (1)$$

Definition 2: $X_1$ and $X_2$ are two discrete random variables over the sample space X. A statistical distance between $X_1$ and $X_2$ is defined as:

$$SD(X_1, X_2) = \frac{1}{2}\sum_{x \in X} \|Pr[X_1 = x] - Pr[X_2 = x]\|, \quad (2)$$

where Pr[ ] denoted the probability and $\|\ \|$ is the absolute value.

Definition 3: A basis is a set of linearly independent vectors $B=\{b_1, b_2, \ldots, b_n\}$ of Euclidian vector space $\mathbb{R}^n$ that spans the full space.

Definition 4: A lattice L is a discrete additive subgroup of $\mathbb{R}^n$ whose elements are generated by the integer linear combinations of the basis $B=\{b_1, b_2, \ldots, b_n\} \subset \mathbb{R}^{n \times n}$.

$$\mathcal{L} = \mathcal{L}(B) \approx \left\{v_i = \sum_{i=1}^{n} z_i b_i : z_i \in \mathbb{Z}\right\}. \quad (3)$$

Definition 5: Given a matrix $A \in \mathbb{Z}_q^{n \times m}$, for some positive integers m, n, and q (prime). The q-ary lattices are defined as:

$$\Lambda_q(A) = \{w \in \mathbb{Z}_q^n : w = As \pmod{q}, \text{ for some } s \in \mathbb{Z}_q^m\}. \quad (4)$$

$$\Lambda_q^{\perp}(A) = \{w \in \mathbb{Z}_q^n : A^t w = 0 \bmod q\}.$$

Shortest Vector Problem (SVP)

The SVP has three variants:

P1) Find the length of the shortest non-zero vector in the lattice L(B).

P2) Find the shortest non-zero vector $v \in L(B)$ such that $\|v\| \in \lambda(L)$.

P3) Find the basis $B=\{b_1, b_2, \ldots, b_n\}$ in L in which max $\|b_i\|$ is the smallest possible up to a polynomial factor.

The construction of the proposed post-quantum fuzzy commitment (PQFC) used in the system 100, has the following mathematical functions:

Post-Quantum Fuzzy Commitment Function $A \in \mathbb{Z}_q^{n \times m}$ is considered to be a matrix generated randomly, and a vector $v \in \mathbb{Z}_q^m$ is chosen randomly. $\mathbb{U} \subseteq \{0,1\}^n$ is considered as a message space. The PQFC function $\mathbb{L}_A$: $\mathbb{U} \times \mathbb{Z}_q^n \rightarrow \{0,1\}^n$ is defined as:

$$w = \mathbb{L}_A(v,u) = (A \times_q v) +_{q,2} u, \quad (5)$$

for some $u \in \mathbb{U}$, where $x_q$ denoted as q-modulo matrix multiplication and $+_{q,2}$ denoted q-modulo and 2-modulo vector addition.

Post-Quantum Fuzzy Commitment $k \in \mathbb{Z}^+$ is considered a security parameter, q is considered as a prime number, while m and n are positive integers such that m,n=poly(k). A post-quantum fuzzy commitment is a tuple of probabilistic polynomial-time algorithms (Setup; CMM; OPEN) such that:

Setup $1^k$: Output the public parameters pp={m; n; q; A}, where $A \in \mathbb{Z}_q^{n \times m}$.

CMM: To commit to a message $u \in \mathbb{U}$, draw a vector $v \in \mathbb{Z}_q^m$ randomly and the output the fuzzy commitment ω such that:

$$CMM_{pp}(v,u) \longrightarrow w$$

OPEN: A valid opening message $u' \in \mathbb{U}$, not necessarily equal to u but sufficiently close in suitable metric distance, can open the fuzzy commitment w:

$$OPEN_{pp}(u',v,w) \rightarrow \mathbb{U} \cup \bot,$$

where $\bot$ return invalid opening message.

Fuzziness Rate of $\mathbb{L}_A$

The system 100 also considers a fuzziness property, which is the tolerance of noise in the opening message.

Considering $\mathbb{U} = \{U_1, U_2, \ldots, U_l\} \subseteq \{0,1\}^n$ for some positive integer l. The minimum distance of two vectors belonging to different sets as follows:

$$\delta_m = \min \delta(u_i, u_j)\ i=1,2,3,\ldots,l \text{ and } j=1,2,3,\ldots,l$$

Thus, the fuzziness rate of $\mathbb{L}_A$ can be calculated as $(\delta_m^2/n)$ %.

The following lemmas show a certain opening message $u' \in \mathbb{U}$, if the distance metric $e=\delta(u,u')$ such that $e^2/n \leq \sigma$, then u' is sufficient to open the fuzzy commitment w.

Lemma 1: $\mathbb{L}_A$ is considered to be a PQFC function with fuzziness rate σ. If $\delta(u,u')/n \leq \sigma$, for u,u', then the fuzzy commitment co may be opened using the message u'.

Proof Since $\delta(u,u')/n \leq \sigma$ is the error resilience of the PQFC function $\mathbb{L}_A$, there is:

$$\delta(w, w') = \sum_{i=1}^{n}(w_i - w_i')^2$$
$$= \sum_{i=1}^{n}((A \times_q v)_i +_{q,2} u_i) - ((A \times \times_q v)_i +_{q,2} u_i')^2;$$
$$= \sum_{i=1}^{n}(u_i - u_i')^2 = \delta(u, u').$$

Therefore, u' opens the fuzzy commitment w.

Security Analysis

Through experimentation, the security of the present system 100 is investigated, and it is evident from the experiments that the system 100 of the present disclosure achieves the security properties (hiding and binding). Theorem 1 shows that an adversary all-powerful algorithm cannot distinguish between the fuzzy commitment of a chosen message and the fuzzy commitment of a uniformly random message. Theorem 2 shows that breaking the binding property of the post-quantum fuzzy commitment solves the SVP problem.

A. Statistical Hiding

Theorem 1: Let $CMM_{pp}(v,u_1)$ and $CMM_{pp}(v,u_2)$ be two random distributions over the same sample space $\{0,1\}^n$. There is an adversary, an all-powerful probabilistic polynomial-time algorithm $\mathcal{A}$ that can break the hiding property of the post-quantum fuzzy commitment except with negligible probability η.

Proof: Let m, n, and q (prime) be positive integers and let $\mathcal{V} \subseteq \mathbb{Z}_q^m$. For any $u \in \mathbb{U}$, the probability distribution $CMM_{pp}(v,u)$ over $\mathbb{U}$ is defined as:

$$CMM_{pp}(v, u) = pr[\mathbb{U} = u] = \sum_{v \in \mathcal{V}} pr[\mathcal{V} = v] \times pr[\mathbb{L}_A(v, u) = w \mid \mathcal{V} = v]$$

Fixing $u_0 \in \mathbb{U}$, and also providing $\mathbb{L}_A(u_0, v_0) = w_0$ for some $v_0 \in V$, the probability is approximated as:

$$pr[\mathbb{L}_A(u_0, v_0) = w_0 \mid \mathcal{V} = v_0] = \begin{cases} \frac{1}{2^m}, & \text{if } v_0 \in \Omega(w_0) \\ 0 & \text{otherwise} \end{cases};$$

where $\Omega(w_0) = \mathbb{L}_A^{-1}(w_0) = \{v_0 : \mathbb{L}_A(u_0, v_0) = w_0\}$ is the set of preimages, and its size is denoted as: $\omega_{w_0, u_0} = |\mathbb{L}_A^{-1}(w_0)| = |\{v_0 : \mathbb{L}_A(v_0, u_0) = w_0\}|$.
The probability $CMM_{pp}(v, u_0)$ may be computed as a stochastic process:

$$Pr[CMM_{pp}(v, u_0)] =$$

$$\sum_{v \in \mathcal{V}} pr[\mathcal{V} = v] pr[\mathbb{L}_A(v, u_0) = w_0 \mid \mathcal{V} = v] = \sum_{v \in \Omega(w_0)} \frac{1}{q^m} \cdot \frac{1}{2^m} = \frac{\omega_{w_0, u_0}}{2^m q^m}.$$

For any $U_1, U_2 \mathbb{U}$ an upper-bound of the statistical difference is estimated:

$$SD(CMM_{pp}(v, u_1), CMM_{pp}(v, u_2)) =$$

$$\frac{1}{2} \sum_w |Pr[CMM_{pp}(v, u_1)] - Pr[CMM_{pp}(v, u_2)]| =$$

$$\frac{1}{2} \sum_{F \in \mathcal{F}} \begin{vmatrix} pr[\mathcal{A}(\mathcal{U}_1, \mathcal{V}) \to (v, u_1) : \\ pr[\mathbb{L}_A(v, u_1) = w_1 \mid \mathcal{V} = v]] \\ -pr[\mathcal{A}(\mathcal{U}_2, \mathcal{V}) \to (v, u_1) : \\ pr[\mathbb{L}_A(v, u_2) = w_2 \mid \mathcal{V} = v]] \end{vmatrix} = \frac{1}{2} \sum_w \left| \sum_{v \in \mathcal{V}} pr[\mathcal{V} = v] \right|$$

$$pr[\mathbb{L}_A(v, u_1) = w_1 \mid \mathcal{V} = v] - \sum_{v \in \mathcal{V}} pr[\mathcal{V} = v] pr[\mathbb{L}_A(v, u_2) = w_2 \mid \mathcal{V} = v] \leq$$

$$\frac{1}{2} \frac{1}{q^m} \sum_w |pr[\mathbb{L}_A(v, u_1) = w_1 \mid \mathcal{V} = v] - pr[\mathbb{L}_A(v, u_2) = w_2 \mid \mathcal{V} = v]| \leq$$

$$\frac{1}{2} \frac{1}{q^m} \sum_w \left| \frac{1}{2^m} \omega_{w_1, u_1} - \frac{1}{2^m} \omega_{w_2, u_2} \right| = \frac{1}{2^{m+1} q^m} \sum_w |\omega_{w_1, u_1} - \omega_{w_2, u_2}| = \eta.$$

Computational Binding

Theorem 2: For the given matrix $A \in \mathbb{Z}_q^{n \times m}$ and the fuzzy commitment $\omega$, if $v$ and $v'$ in $\mathbb{Z}_q^m$ be two vectors are used to commit two different messages $u, u' \in \mathbb{U}$ such that $\mathbb{L}_A(v,u) = \mathbb{L}_A(v',u')$ and $\delta(u,u') > n\sigma$, then one can solve the SVP problem efficiently.
Proof: Let $v \in \mathbb{Z}_q^m$ and $u \in \mathbb{U}$ such that $w = (A \times_q v) +_{q,2} u$ and $v' \in \mathbb{Z}_q^m$ and $u' \in \mathbb{U}$ such that $w' = (A \times_q v') +_{q,2} u')$ with $\delta(u,u') > n\sigma$. Then:

$$\mathbb{L}_A(v, u) = \mathbb{L}_A(v', u')s$$

$$(A \times_q v) +_{q,2} u = (A \times \times_q v') +_{q,2} u'$$

$$P A \times_q (v - v') +_{q,2} (u - u') = 0$$

Since $\delta(u,u') > n\sigma$, then it implies one can find a short vector $v - v' \neq 0$, which is a contradiction to the SVP problem of lattice.

During enrollment of the smart card 102 with the system 100 or the authentication server 112, the microprocessor 108 of the smart card 102 is configured to receive the random matrix, A from the authentication server 112. After receiving the random matrix, the microprocessor 108 generates a random secret vector, $v \in \mathbb{Z}_q^m$.

Further, the microprocessor 108 is configured to calculate a lattice vector, $\Lambda_l$, from the random matrix, given by:

$$\Lambda_l = A \times_q v, \qquad (6)$$

where $\times_q$ represents matrix multiplication modulo q. In some examples, the lattice vector is a lattice-iris vector, a lattice-fingerprint vector, a lattice-voice vector, a lattice-finger vein pattern vector, a lattice-palm vector, and a lattice-facial vector.

The microprocessor 108 calculates a first post quantum fuzzy commitment, $B_r$, based on the calculated lattice vector $\Lambda_l$. The first post quantum fuzzy commitment is given by:

$$B_r = \Lambda_l +_{q,2} t_r, \qquad (7)$$

where $+_{q,2}$ represents q-modulo and 2-modulo vector addition. For example, the lattice vector $\Lambda_l$ is the lattice-iris vector, $\Lambda_l$. The microprocessor 108 stores the lattice-iris vector, $\Lambda_l$, in the memory 104 of the smart card 102. Also, the microprocessor 108 transmits the first calculated post quantum fuzzy commitment, $B_r$, to the authentication server 112. After transmitting the first post quantum fuzzy commitment, $B_r$, the microprocessor 108 deletes the biometric template, $t_r$, from the memory 104.

During authentication of the smart card 102 by the authentication server 112 during a transaction, the user first inserts the smart card 102 into the card reader. The biometric probe 110 receives the biometric probe traits from the user. In operation, on executing the program instructions, the microprocessor 108 is configured to receive the biometric probe traits from the biometric probe 110. The microprocessor 108 of the smart card 102 extracts a biometric probe template, $t_p$, from the received biometric probe traits and stores the extracted biometric probe template, $t_p$, in the memory 104. In examples, each received biometric probe template, $t_p$, is unique as it corresponds to each user.

Further, the microprocessor 108 is configured to calculate a second post quantum fuzzy commitment, $B_p$, by using the biometric probe template, $t_p$. The second post quantum fuzzy commitment, $B_p$ is given by:

$$B_p = \Lambda_l +_{q,2} t_p. \qquad (8)$$

After calculating the second post quantum fuzzy commitment, $B_p$, the microprocessor 108 transmits the calculated second post quantum fuzzy commitment, $B_p$, to the authentication server 112 and deletes the biometric probe template, $t_p$, from the memory of 104 the smart card 102.

For authenticating the smart card 102, the authentication server 112 is configured to receive the second post quantum fuzzy commitment, $B_p$ from the smart card 102 and determines a matching score, $\delta_m$, by calculating a statistical distance between the second post quantum fuzzy commitment, $B_p$, and the first post quantum fuzzy commitment, $B_r$. The authentication server 112 is further configured to compare the matching score, $\delta_m$, to a threshold, $\sigma$ fetched from a database, associated with the authentication server 112. For example, the threshold, $\sigma$, is calculated as $\sigma = \delta_m^2 / n \times 100\%$. In some examples, the authentication server 112 compares the biometric templates indirectly (in a protected manner).

If the matching score, $\delta_m$, is less than or equal to the threshold, σ, the authentication server 112 authenticates the transaction. If the matching score, $\delta_m$, is greater than the threshold, σ, the authentication server 112 declines the transaction.

The system 100 may include a display (not shown) for instructing the user for providing her/his biometric traits. For example, the display may show a message such as "Please put your finger on the biometric probe," or "Please look into the iris reader". The user may be prompted to place his finger properly or adjust his gaze if the system 100 is unable to receive a proper fingerprint trait or iris trait, respectively. If the above authentication fails, the authentication server 112 may issue an appropriate error message to be displayed on the display. In an example, the display is connected to the card reader. In another example, the display is fabricated on the smart card 102.

Figure 2:
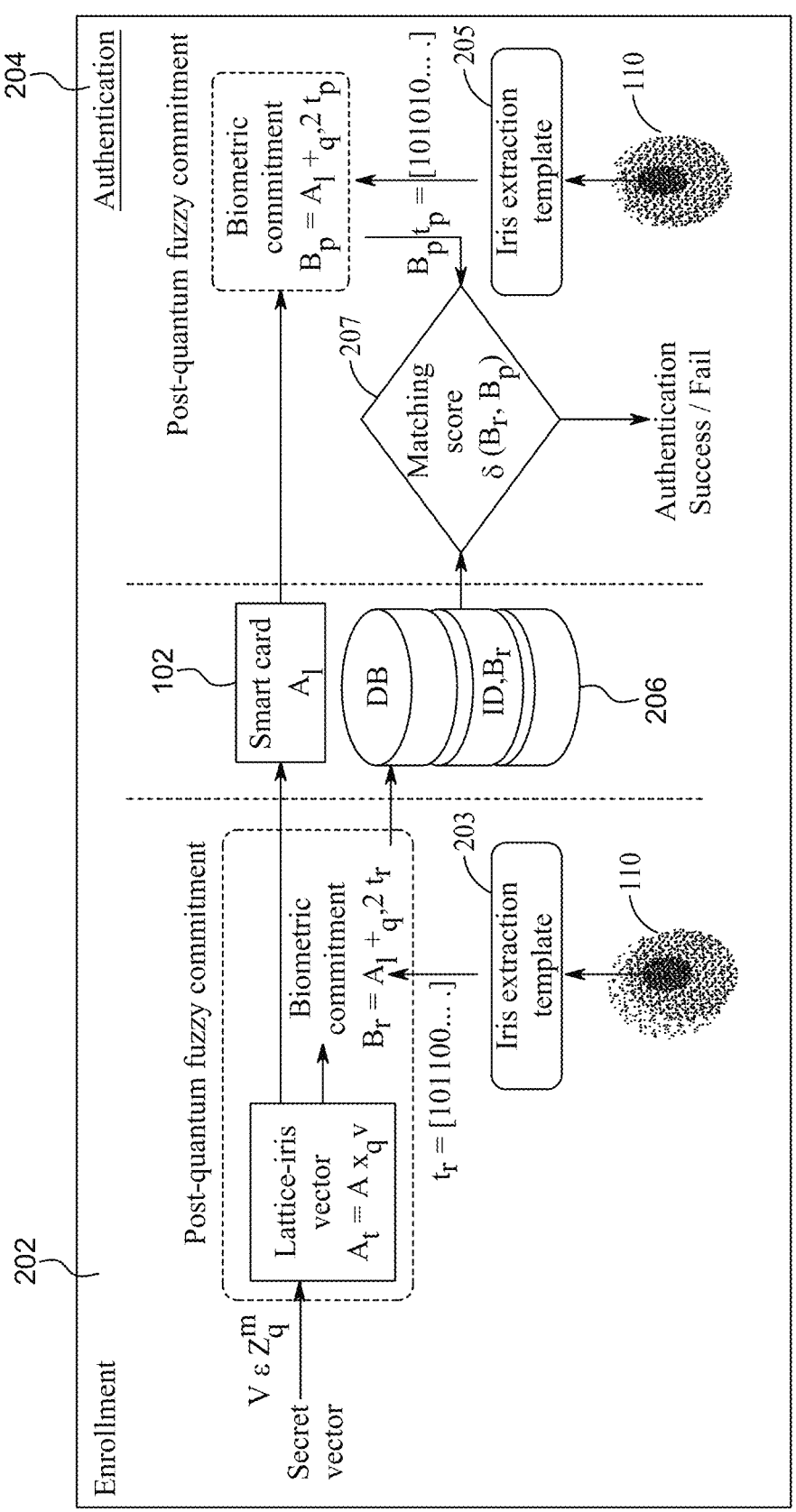
FIG. 2 illustrates an architecture of a biometric-based post-quantum fuzzy commitment (PQFC) authentication system, according to aspects of the present disclosure.

FIG. 2 illustrates an architecture of a biometric-based Post-Quantum Fuzzy Commitment (PQFC) authentication system, according to aspects of the present disclosure. The present disclosure is configured to employ the PQFC for an effective and practical biometric template protection system. The PQFC authentication system includes two stages: enrollment stage 202 of the smart card 102, and authentication stage 204 of the smart card 102, as illustrated in FIG. 2.

During the enrollment stage 202, when the user wants to enroll in the system 200, the smart card 102 receives a random matrix ($A \in \mathbb{Z}_q^{n \times m}$) from the authentication server 112. Based on the received random matrix, the smart card 102 generates a secret vector randomly $v \in Z_q^m$. The smart card 102 also receives a recorded biometric trait from the user using the biometric probe 110. In an example, the biometric probe 110 is an iris scanner, and the recorded biometric template is an iris template. For example, the terms "biometric template", "biometric information", and "biometric image" are used somewhat interchangeably herein, with deference to the ability of one of skill to determine from context whether a reference is being made to the source of raw data, to raw data, or to a data structure derived by processing data, for example.

The smart card 102 calculates the lattice vector, $\Lambda_I$, by multiplying the sector vector with the received random matrix A. The lattice vector $\Lambda_I$ is given as $\Lambda_I = A \times_q v$, where $\times_q$ represents matrix multiplication modulo q.

The smart card 102 extracts the iris feature from the biometric trait and generates an iris extraction template shown by 203. The iris extraction template is further converted to an iris reference template $t_r$ as a vector of bits from the received biometric trait. In examples, the lattice vector is a lattice-iris vector that has the same size n×1, as the iris reference template $t_r$. Finally, the smart card 102 computes the biometric commitment $B_r$ given as:

$$B_r = \Lambda_I +_{q,2} t_r,$$

where $+_{q,2}$ applies vector addition modulo q, and the result goes through modulo 2. In some examples, the lattice-iris vector $\Lambda_I$ is stored in the smart card 102 and the computed biometric commitment $B_r$ along with a user identity (uniquely assigned to each smart card 102) is transmitted to the authentication server 112 to be saved in a database, associated with the authentication server 112.

During authentication stage 204, when the user wants to authenticate himself to the system 200 by using the smart card 102, he/she needs to follow the following steps:

The user inserts his/her smart card 102 into the card reader and presents his/her biometric probe trait. For example, the biometric probe trait is retina (iris). The biometric probe 110 receives biometric probe trait from the user. The biometric probe 110 extracts the iris feature from the received biometric trait and generates an iris extraction template shown by 205. The smart card 102 is configured to extract an iris probe template $t_p$ from the iris extraction template. Next, the smart card 102 computes the biometric commitment $B_p$ based on the lattice vector, $\Lambda_I$ stored in the memory 104. The biometric commitment is given as:

$$B_p = \Lambda_I +_{q,2} t_p.$$

Further, the biometric commitment $B_p$ is transmitted to the authentication server 112. The authentication server 112 receives the biometric commitment $B_p$ from the smart card 102 and Br is fetched from the database 206. The authentication server 112 computes the matching score $\delta_m$ between the $B_p$ and the Br (as shown 207). If the matching score $\delta_m$ falls within a system threshold (fuzziness rate), then the user is authenticated. Otherwise, authentication fails.

Figure 3:
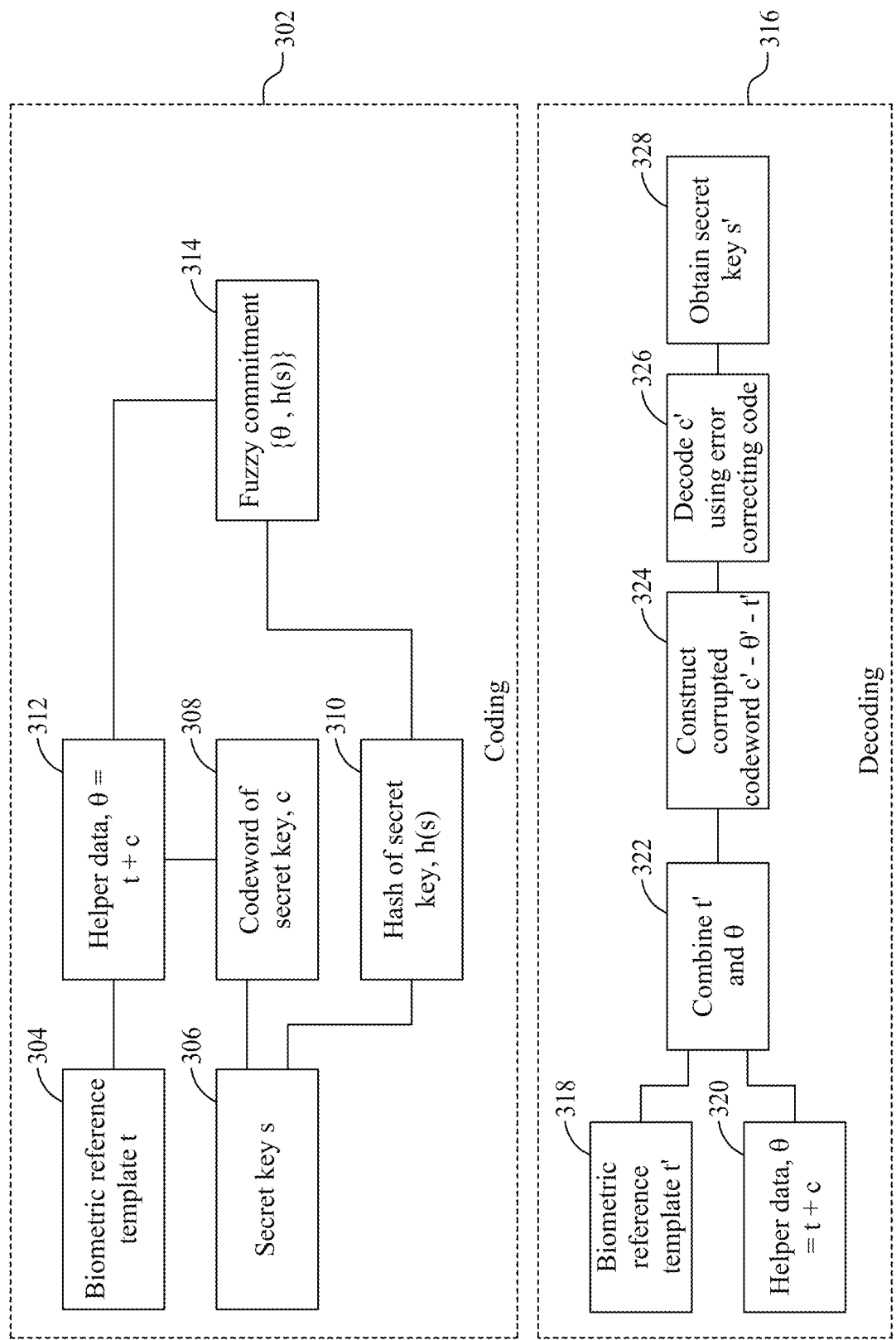
FIG. 3 illustrates a conventional method for biometric template coding and decoding.

FIG. 3 (prior art) schematically illustrates a conventional approach for biometric template coding and decoding. The conventional approach for implementing the biometric template includes two steps: coding 302 and decoding 316. In the conventional approach, a database stores biometric templates committed in an enrollment phase. This stored commitment protected biometric template is opened or de-committed if the authentication phase's biometric query template is sufficiently close to one in the enrollment phase.

During the step of coding (302), the user presents a biometric reference template t in the enrollment phase (shown as reference numeral 304). In some examples, the biometric reference template t is represented by a fixed-size binary string x. As shown in step 306, a secret key s is generated by the server. The secret key s is further divided using an error-correcting code (ECC) into two parts: a codeword of secret key c (encoded form of the secret key) shown as 308, and a hash of secret key h(s) shown by reference numeral 310. A helper data, θ is generated by adding the biometric reference template t and the codeword of secret key c (as shown by reference numeral 312). This helper data θ and the hash of secret key h(s) are stored in the database. A fuzzy commitment (shown as 314) is generated by considering functions helper data θ and the hash of secret key h(s).

During step of decoding 316, in the authentication phase, the user presents a biometric template t' (shown as 318), that is represented as fixed-size binary string x'. The helper data θ (shown as 320) is fetched from the database. The helper data θ (shown as 322) is further added to the biometric template t'. The system further constructs a corrupted codeword as c'-θ-t' (shown as 324). This constructed corrupted codeword c' is decoded as c" using the same error-correcting code ECC (as used in the enrollment phase) (shown as 326). After decoding the c" a secrete key s' of the c" is calculated (shown as 328). If the biometric templates t and t' are sufficiently close, then s=s', else not. Thereby, the error-correcting capacity of ECC eliminates the difference in bits of fixed-size representation x and x'. Based on the aforementioned discussion, the security of the conventional system relies on ECC, which downgrades its security and privacy, as well as the accuracy performance.

Figure 4:
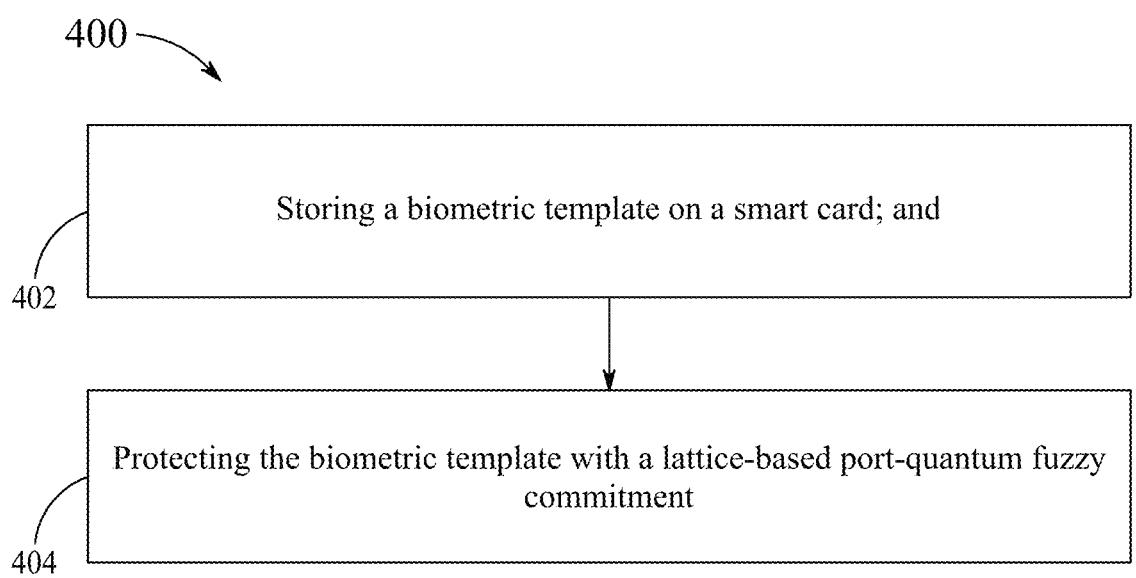
FIG. 4 is a flowchart for biometric template protection, according to aspects of the present disclosure.

FIG. 4 illustrates a method 400 for biometric template protection, according to aspects of the present disclosure.

Step 402 includes storing a biometric template on a smart card 102.

Step 404 includes protecting the biometric template with a lattice-based post-quantum fuzzy commitment.

Figure 5:
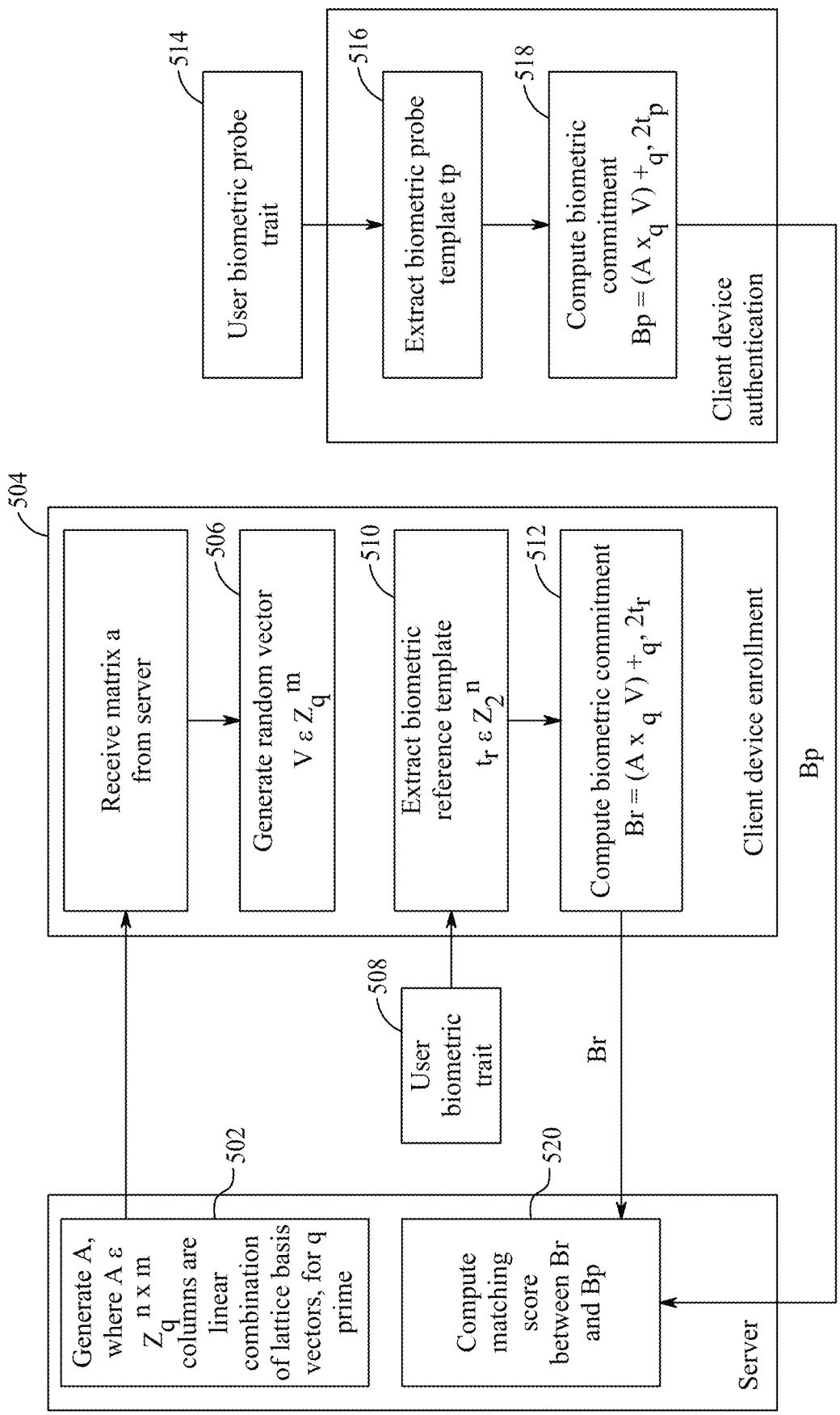
FIG. 5 is a flowchart for protecting the biometric template using PQFC, according to aspects of the present disclosure.

FIG. 5 is a flowchart for protecting the biometric template using PQFC, according to aspects of the present disclosure.

The method further includes a step 502 of generating a randomly generated matrix by the authentication server 112. The randomly generated matrix is given by:

$$A \in \mathbb{Z}_q^{n \times m},$$

where A represents m columns of n basis vectors, q is a prime number, n is an integer representing a number of columns in the matrix, and m is an integer representing a number of rows in the matrix. In an example, the columns are a linear combination of lattice basis vectors, for q prime. Collectively, steps 504-512 are related to the enrollment of the smart card 102.

Step 504 includes receiving of randomly generated matrix from the authentication server 112 by the smart card 102.

Step 506 includes randomly generating a secret vector, $v \in \mathbb{Z}_q^n$ by the smart card 102.

Step 508 includes receiving a biometric trait by the smart card 102 using the biometric probe 110.

Step 510 includes extracting, by the smart card 102, a biometric reference template, $t_r$, from the received biometric trait. In examples, the biometric reference template is given as $t_r \in \mathbb{Z}_2^n$. In another aspect, the smart card 102 calculates a lattice vector, $\Lambda_l$. The lattice vector, $\Lambda_l$ is given by $\Lambda_l = A \times_q v$, where $\times_q$ represents matrix multiplication modulo q. In some examples, the method further includes a step of storing the lattice-iris vector, $\Lambda_l$, by the smart card 102 in a memory 104 of the smart card 102.

Step 512 includes calculating a first post quantum fuzzy commitment, $B_r$, by the smart card 102. The first post quantum fuzzy commitment, $B_r$, is given by: $B_r = \Lambda_l +_{q,2} t_r$, where $+_{q,2}$ represents q-modulo and 2-modulo vector addition. The method further includes a step of transmitting the first post quantum fuzzy commitment, $B_r$, by the smart card 102 to the authentication server 112. The method further includes a step of storing, by the authentication server 112, the first post quantum fuzzy commitment, $B_r$, in a database of the authentication server 112.

Steps 514-520 are related to the authentication of the smart card 102.

Step 514 includes receiving a biometric probe trait from a biometric probe 110.

Step 516 includes extracting a biometric probe template, $t_p$, from the biometric probe trait by the smart card 102.

Step 518 includes calculating, by the smart card 102, a second post quantum fuzzy commitment, $B_p$, given by: $B_p = \Lambda_l +_{q,2} t_p$. The step further includes transmitting, by the smart card 102, the second post quantum fuzzy commitment, $B_p$, to the authentication server 112. In some examples, the biometric probe template, $t_p$, is deleted from the smart card 102 after calculating the second post quantum fuzzy commitment, $B_p$.

Step 520 includes determining, by the authentication server 112, a matching score, $\delta_m$, by calculating a statistical distance between the second post quantum fuzzy commitment, $B_p$, and the first post quantum fuzzy commitment, $B_r$. The step 520 further includes computing, by the authentication server 112, the matching score, $\delta_m$, to a threshold, $\sigma$. When the matching score, $\delta_m$, is less than or equal to the threshold, $\sigma$, authenticating the transaction; and when the matching score, $\delta_m$, is greater than the threshold, $\sigma$, declining the transaction. The method further includes a step of calculating the threshold, $\sigma$, based on $\sigma = \delta_m^2/n \times 100\%$.

The following examples are provided to illustrate further and to facilitate the understanding of the present disclosure.

The system 100 (biometric-based PQFC authentication system) was executed using an iris database which includes 108 samples. The biometric-based PQFC authentication has been implemented in MATLAB R2020b. Initially, the public parameter (public key) of the PQFC, an n×m matrix A was generated, where its entries are elements in $\mathbb{Z}_q$. Firstly, linearly independent vectors of the matrix A were generated. For the random generation of an m×1 secret vector in $\mathbb{Z}_q$, the combination of MATLAB functions Rand and Round were used. The extraction of an n×1-bit vector iris-code reference template $t_r$ required an iris recognition algorithm. The MATLAB source code of the iris recognition system was utilized and was available in public domain.

To compute the biometric commitment $B_r = \Lambda_l +_{q,2} t_r$, in the enrollment stage, firstly, the lattice-iris vector $\Lambda_l = A \times_q v$ was computed by applying the MATLAB code as q-modulo matrix multiplication, and then $\Lambda_l$ was stored. Secondly, the resultant lattice-iris vector $\Lambda_l$ and the iris reference template $I_r$ were combined through MATLAB code as q-modulo vector addition. Finally, the resultant vector was transformed to an n 1-bit vector by MATLAB code 2-modulo operation.

In order to measure a recognition accuracy of the system 100, genuine and imposter matching scores distributions were computed. For a genuine matching scores distribution, both biometric commitments $B_r$, given by: $B_r = \Lambda_l +_{q,2} t_r^g$ and $B_p = \Lambda_l +_{q,2} t_p^g$ were computed using the same secret vector and different iris templates $t_r^g$ and $t_p^g$ belonging to the same person. For imposter matching scores distribution, both biometric commitment $\mathfrak{B}_r = A \times_q v^g +_{q,2} t_r^g$ and $\mathfrak{B}_p = A \times_q v^{p} +_{q,2} t_p^i$ were computed using different vectors $v^g$ and $v^p$ and different iris template $t_r^g$ and $t_p^g$ belonging to different users.

As a part of the experiment, a performance analysis of an unprotected biometric-based authentication system and the biometric-based PQFC authentication system was performed. In both systems, the same iris recognition system and iris database were used. The evaluation was done based on the standard performance metrics: False Acceptance Rate (FAR), False Rejection Rate (FRR), and Error Equal Rate (EER).

Performance Analysis for the Unprotected Biometric Authentication

The biometric-based authentication system without PQFC was implemented and referred to as the unprotected biometric system. For this analysis, Masek and Kovesi iris recognition system and the CASIA_ver1 iris database were adopted as the unprotected biometric system. In examples, the Masek and Kovesi iris recognition system is a biometric identification system based on iris patterns. The MATLAB source code for Masek and Kovesi iris recognition system was available in the public domain. In a similar example, the CAISA_ver1 database was available in public domain. For example, CASIA Iris Image Database Version 1.0 (CASIA-IrisV1) includes 756 eye images from 108 different persons, where each person has 7 eye images. A 2048-bit iris-code along with a 2048-bit mask-code was extracted using the Masek and Kovesi system. The matching score $\delta_u$ for an unprotected biometric authentication system between two iris templates $T_A$ and $T_B$ with mask-codes was computed as follows:

$$\delta_u = \frac{\|(t_A \oplus t_B) \wedge (M_A \wedge M_B)\|}{\|(M_A \wedge M_B)\|}, \quad (9)$$

where $t_A$ and $M_A$ is the iris-code and mask-code for iris template $T_A$ and similar for template $T_B$ and $\oplus$ and $\wedge$ are bitwise XOR and operations. For genuine distribution, 2,268 genuine matching scores were computed and 283,122 for imposter matching scores by choosing iris images from different persons.

Figure 6A:
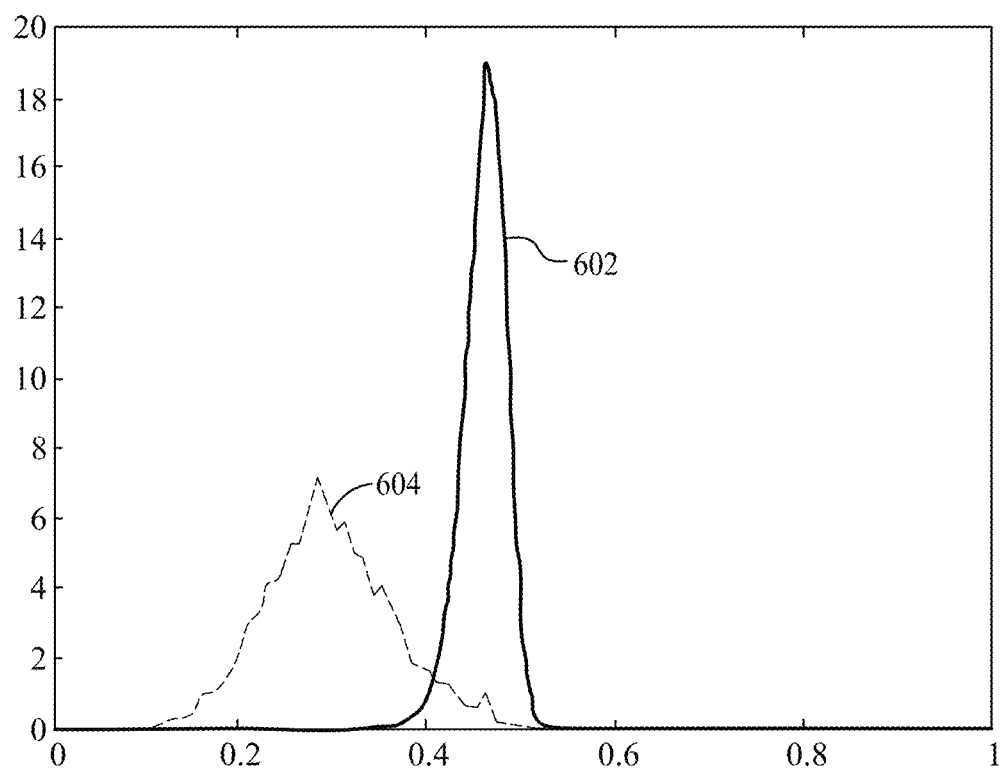
FIG. 6A illustrates a graph representing genuine and imposter distributions for an unprotected biometric-based authentication system, according to aspects of the present disclosure
Figure 6B:
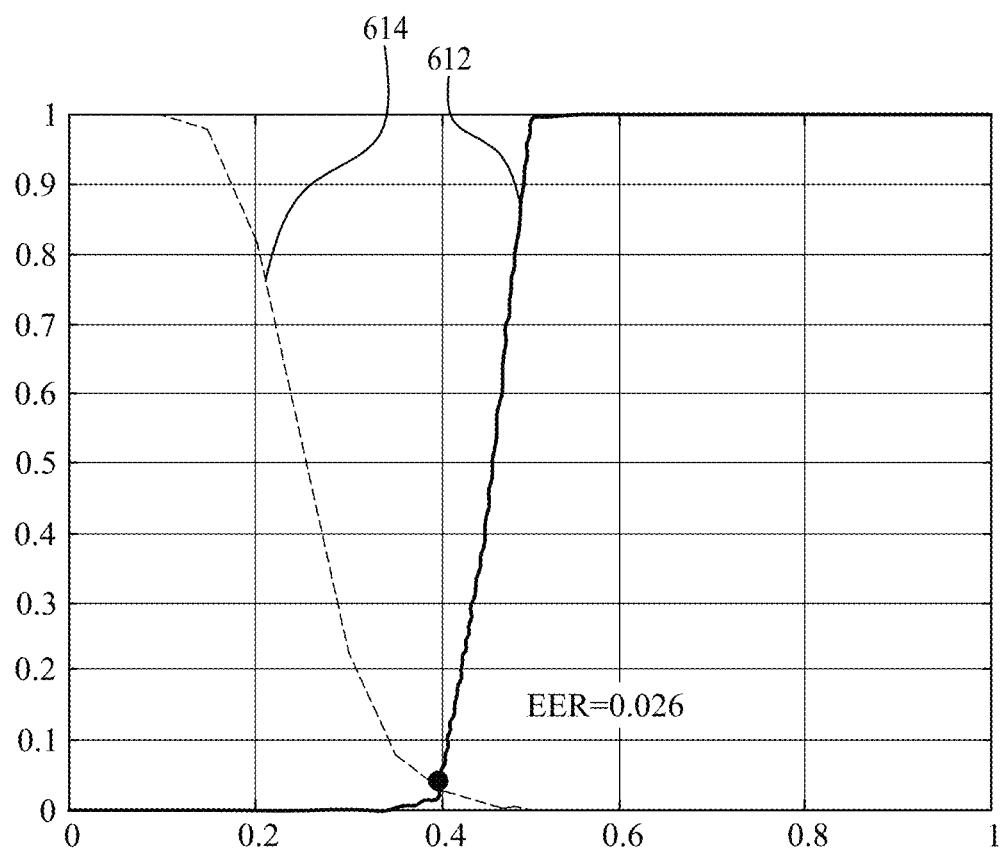
FIG. 6B illustrates a detection error trade-off (DET) curve for the unprotected biometric-based authentication system, according to aspects of the present disclosure.

FIG. 6A illustrates a graph representing genuine and imposter distributions for the unprotected biometric-based authentication system, according to aspects of the present disclosure. The x axis represents the matching scores and the y axis represents the probability. Signal 602 illustrates a genuine distribution for the unprotected biometric-based authentication system, while signal 604 refers to an imposter distribution for the unprotected biometric-based authentication system. Further, FIG. 6B illustrates a detection error trade-off (DET) curve for the unprotected biometric-based authentication system. The x axis represents the threshold for the distance measurement and the y axis represents the probability of acceptance or rejections. Signal 612 illustrates the DET curve for the genuine distribution, while signal 614 refers to the DET curve for imposter distribution. An accuracy performance for the unprotected biometric-based authentication system of 97.4% was achieved. The Error Equal Rate (EER) determines the value, where the False Acceptance Rate and the False Rejection Rate are equal. The EER of 0.0257 (approx. 0.026) is obtained for the unprotected biometric system, as shown in FIG. 6B. If the threshold of 40% for the unprotected biometric-based authentication system is reached, a FAR of 1.5% and FRR of 2.9% are achieved.

Performance Analysis for the Biometric-Based PQFC Authentication

The performance evaluation of the system 100 (biometric-based PQFC authentication system) was developed to estimate the recognition accuracy measurements, to analyze the impact of the disclosed PQFC on the unprotected biometric-based authentication system, and analyze the main security requirements of the standard ISO/IEC 24745 of the biometric template protection, such as renewability, unlinkability, and irreversibility provided by the system 100.

To evaluate the present system 100, an experimental implementation was carried out on the widely known CASIA_ver1 iris database. The Masek and Kovesi algorithm is utilized to extract the iris templates. In examples, the Masek and Kovesi algorithm is used for developing an 'open-source' iris recognition system in order to verify both the uniqueness of the human iris and also its performance as a biometric. The iris recognition system, as disclosed by Masek and Kovesi, includes an automatic segmentation system that is based on the Hough transform, and is able to localize the circular iris and pupil region, occluding eyelids and eyelashes, and reflections. For implementation setup, the parameters n=2048, m=512, and q=1009 are defined. A 2048×512 matrix A of linear combination vectors of a lattice was generated using known algorithms, for example, Fampa et al. algorithm. The Fampa et al. algorithm discloses local-search procedures to construct sparse block-structured generalized inverses that satisfy only some of the M-P properties. It also uses 1-norm minimization to induce sparsity and to keep the magnitude of the entries under control, and limit the distance between the 1-norm of the solution of the local searches and the minimum 1-norm of generalized inverses with corresponding properties. A q-modulo random vector of the size of 512×1 was generated using MATLAB building codes Rand and Round and then by computing the lattice-iris vector $\Lambda_I$.

Table 1 shows the execution time of the main operations and the storage requirement in the system 100 (also referred to as biometric-based PQFC authentication system 100).

The execution time ran on MATLAB R2020b software in an Intel® Corei7-10700 CPU @ 2.90 GHz. The most costly operation is the generation of the matrix A. However, this operation is required only once in the enrollment stage. To reduce the computation and storage costs, the lattice-iris vector is only stored in the smart card 102. At the authentication stage, the user will present the smart card 102 and use the biometric probe 110 to generate his probe trait, and the system will compute the biometric commitment $B_p = \Lambda_I +_{q,2} t_p$ using q-modulo addition.

TABLE 1

Generation, computation, and storage costs of the main operations.

| Generation (ms) | | Computations (ms) | | Storage (bits) | |
|---|---|---|---|---|---|
| A | v | $\Lambda_1$ | $B_r$ | $\Lambda_1$ | $B_r$ |
| 17,730 | 0.08 | 0.15 | 0.12 | 2048 | 2048 |

To estimate the recognition accuracy of the system 100, the following formula is implemented to compute the matching score between two biometric commitments $B_r$ and $B_p$ is used.

$$\delta_L(\mathcal{B}_r, \mathcal{B}_p) = \frac{\|(\mathcal{B}_r \oplus \mathcal{B}_p) \wedge (M_r \wedge M_p)\|}{\|(M_r \wedge M_p)\|}\% \quad (10)$$

where $B_r$ and $B_p$ are computed using iris-codes $t_r$ and $t_p$.

Figure 7A:
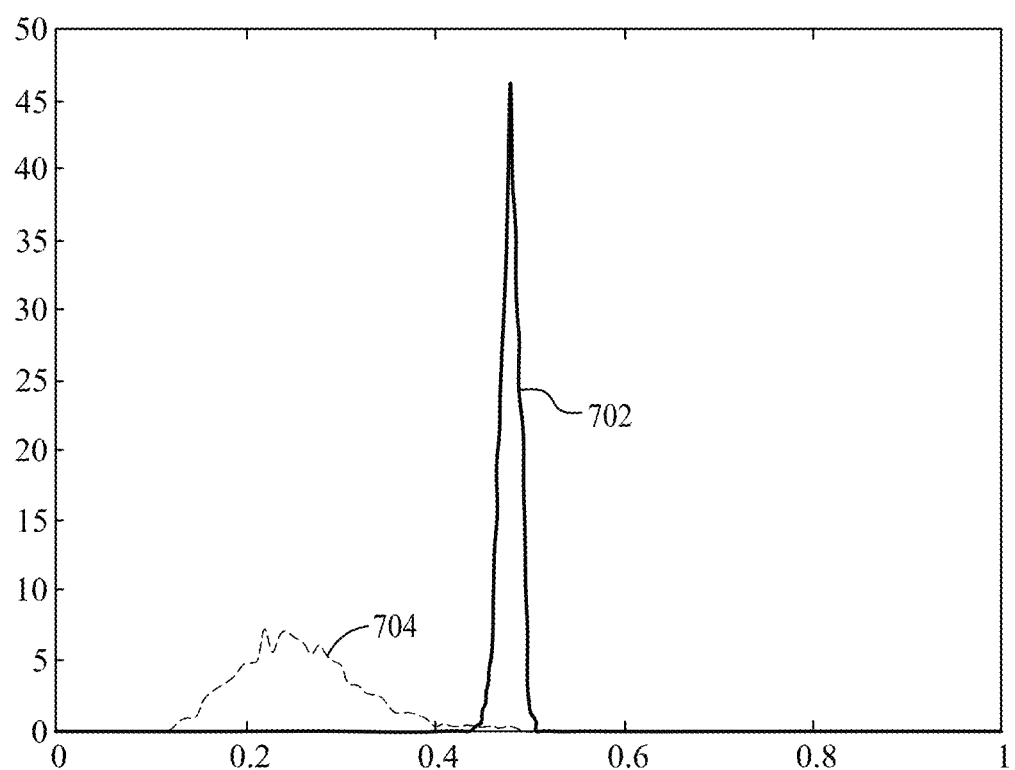
FIG. 7A illustrates a graph representing genuine and imposter distributions for the biometric-based PQFC authentication system, according to aspects of the present disclosure
Figure 7B:
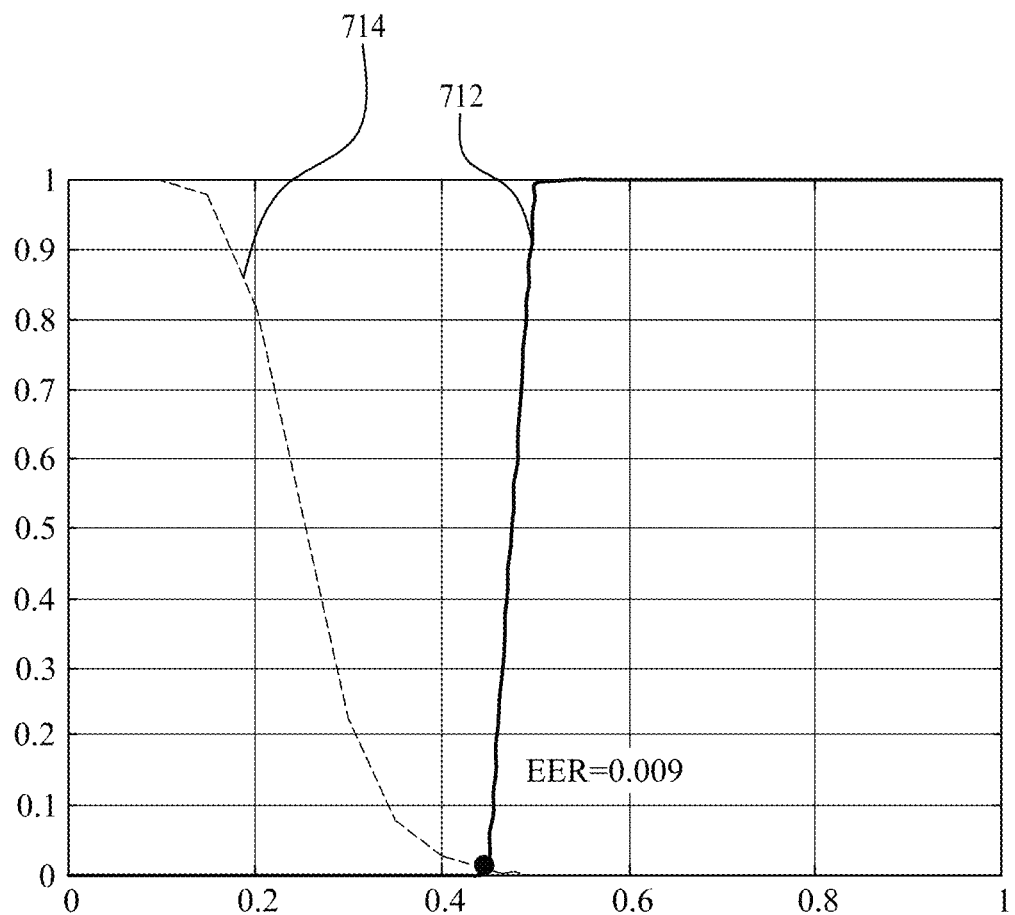
FIG. 7B illustrates a DET curve for the biometric-based PQFC authentication system, according to aspects of the present disclosure.

The performance of the biometric-based PQFC authentication system 100 is described by its recognition accuracy, the EER, the FAR, and the FRR. The system 100 achieved recognition accuracy of 99.1% (EER D 0.009), a FAR of 0%, and an FRR equaling 2.9 at the threshold of 40%. These results are described in the graphical measurements as shown in FIGS. 7A-7B. FIG. 7A illustrates a graph representing genuine and imposter distributions for the biometric-based PQFC authentication system. The x axis represents the matching scores and the y axis represents the probability. Signal 702 illustrates a genuine distribution for the biometric-based PQFC authentication system, while signal 704 refers to an imposter distribution for the biometric-based PQFC authentication system. Further, FIG. 7B illustrates a detection error trade-off (DET) curve for the biometric-based PQFC authentication system. The x axis represents the threshold for the distance measurement and the y axis represents the probability of acceptance or rejection. Signal 712 illustrates the DET curve for the genuine distribution, while signal 714 refers to the DET curve for imposter distribution for the biometric-based PQFC authentication system. As a result, the post-quantum fuzzy commitment improves the recognition accuracy when employed in the biometric-based PQFC authentication system 100.

Table 2 shows the performance comparisons of the biometric PQFC authentication system and the unprotected biometric-based authentication system.

TABLE 2

| | Iris-based traditional biometric | | | Biometric-based PQFC system | | |
|---|---|---|---|---|---|---|
| $\delta_{th}$ % | FAR % | FRR % | EER | FAR % | FRR % | EER |
| 10 | 0 | 100 | 0.026 | 0 | 100 | 0.009 |
| 15 | 0 | 98 | | 0 | 98 | |

TABLE 2-continued

| | Iris-based traditional biometric | | | Biometric-based PQFC system | | |
|---|---|---|---|---|---|---|
| $\delta_{th}$ % | FAR % | FRR % | EER | FAR % | FRR % | EER |
| 20 | 0 | 82.6 | | 0 | 82.5 | |
| 25 | 0 | 51.4 | | 0 | 51.2 | |
| 30 | 0 | 23.1 | | 0 | 22.8 | |
| 35 | 0.015 | 8.3 | | 0 | 8.2 | |
| 40 | 1.5 | 2.9 | | 0 | 2.9 | |
| 45 | 38.7 | 0.9 | | 0.2 | 0.8 | |
| 50 | 99.4 | 0 | | 99.4 | 0 | |
| 55 | 100 | 0 | | 100 | 0 | |

Table 3 shows a comparison between the biometric-based PQFC authentication system and other biometric protection techniques.

TABLE 3

| Cryptographic approach | Database | FAR % | FRR % |
|---|---|---|---|
| FC | CASIA-Ver3 | 0.08 | 6.57 |
| FC | Iris-Ver1 | 1.16 | 28.3 |
| FC | CASIA-Ver3 | 0 | 8.12 |
| FC | FVC2000-DB2 | 0.29 | 2.5 |
| CC | THU-FVFDT3 | 0 | 0.34 |
| Present System LC | CASIA-Ver1 | 0 | 2.9 | where FC=Fuzzy Commitment, CC=Code-based Cryptography, and LC=Lattice-based Cryptography.

To compile the security properties of the present system according to the ISO/IEC 24745 standard for biometric template protection, various factors listed as below are determined:

A. Renewability

Unlike a password, a biometric cannot be revoked once it is compromised because individuals have a limited number of biometrics. The renewability property refers to the ability to generate multiple protected biometric reference templates from the same biometric trait. The biometric-based PQFC authentication system 100 satisfied the renewability property, as depicted during the experiment and analysis.

The user may generate a huge number of independent post-quantum fuzzy commitments $B_r$ from the same biometric trait by choosing different secret random vectors $v \in Z_q^m$. Furthermore, the renewability ensures the privacy of the stored protected biometric template. Since each committed template includes only a column of the biometric template, the privacy of the biometric trait is preserved. In this context, each revoked biometric template should not cross-match with those previously created from the same biometric trait. To measure the renewability of the biometric-based PQFC authentication system 100, a correlation between the imposter distributions for the biometric commitments and the unprotected templates was used.

Figure 8:
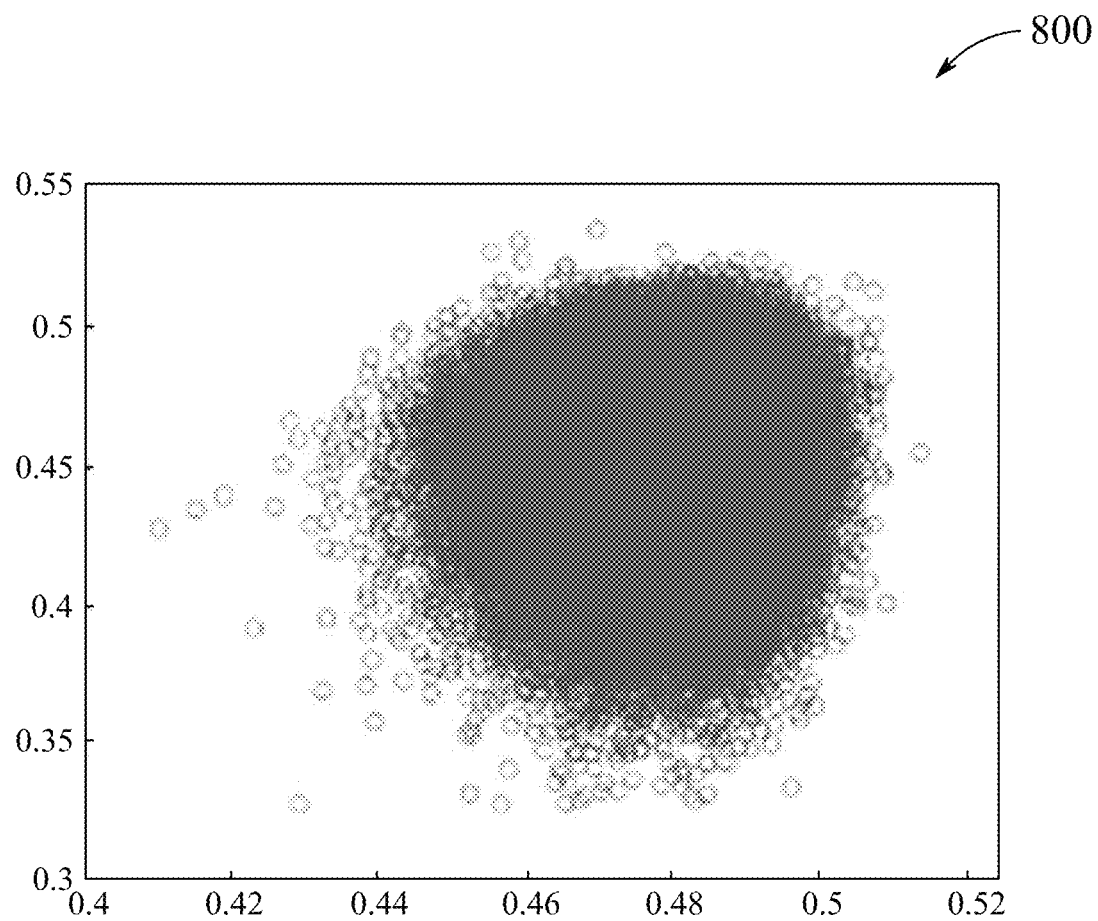
FIG. 8 shows a correlation between templates protected by biometric commitments versus unprotected templates, according to aspects of the present disclosure.

FIG. 8 shows a correlation 800 between biometric commitments and unprotected templates. The x axis represents the unprotected imposter biometric distance and the y axis represents the protected imposter biometric distance. Furthermore, some data sets corresponding to the biometric commitments and unprotected templates were taken and analyzed. As shown by 802, 804, and 806, there is no correlation between the biometric commitments and unprotected templates in the analyzed data sets. Overall, the result is shown in FIG. 8, which illustrates that there is no linear relationship between each protected template (correlation coefficient of 0.06). Hence, the biometric-based PQFC authentication system 100 satisfied the renewability property.

A biometric template protection system is resistant to similarity-based attacks if the correlation between the distances of the protected imposter biometric data and unprotected imposter biometric data is very small. The result obtained for the PQFC shown in FIG. 8 illustrates that the protected impostor distances (y-axis) do not change with respect to their unprotected impostor distances (x-axis), that is, their correlation is 0.06, which is quite small. Therefore, it is very difficult for an attacker to learn the biometric data from the protected biometric using PQFC.

B. Unlinkability

Figure 9:
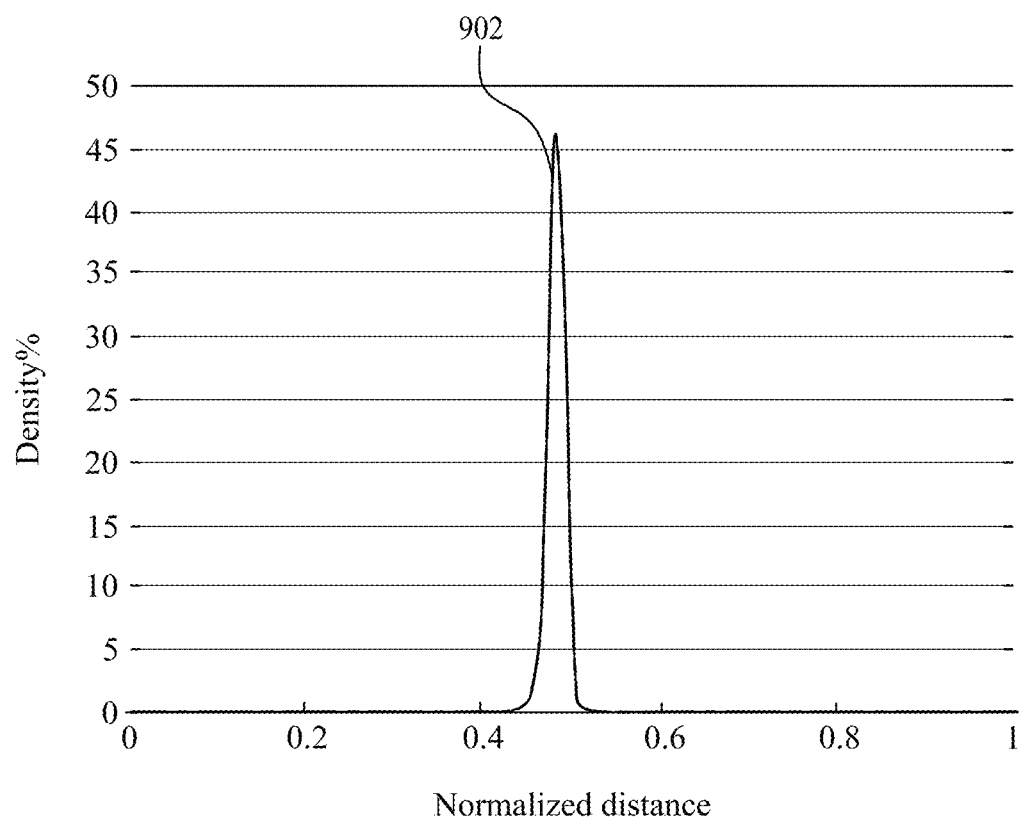
FIG. 9 shows a graph representing distributions of the matching scores for an unlinkability measurement, according to aspects of the present disclosure.

FIG. 9 shows a graph representing distributions of the matching scores for an unlinkability measurement, according to aspects of the present disclosure. The unlinkability is a property that refers to the guarantee that the biometric reference template used in different applications is untraceable. In other words, the unlinkability ensures that the attacker has no significant advantages when determining that two protected biometric reference templates are generated from the same biometric trait. To evaluate the biometric-based PQFC authentication system 100 against unlinkability, a framework disclosed known in the art is used. For two given random biometric reference templates $t_r^1$ and $t_r^2$ from two different biometric traits and different random vectors $v^1$ and $v^2$, the following equation holds:

$$\delta_L(\mathfrak{B}_r^1, \mathfrak{B}_r^2) > \sigma$$

In the case of genuine users $\mathfrak{B}_r^1 = A \cdot v^1 + t_r^1$ and $\mathfrak{B}_r^2 = A \cdot v^2 + t_r^1$.

For imposter users $\mathfrak{B}_r^1 = A \cdot v^1 + t_r^1$ and $\mathfrak{B}_r^2 = A \cdot v^2 + t_r^2$.

FIG. 9 shows the distribution of the imposter matching scores and the genuine matching scores for the system 100. As known in the art, if both distributions overlap, unlinkability is achieved (as shown by signal 902). As a result, the biometric-based PQFC authentication system satisfied the unlinkability property. Moreover, using a Kullback-Leibler (KLD) divergence which measures the difference between two probability distributions, a value of KLD is obtained that is 0.002.

C. Irreversibility

It is infeasible for the attacker to recover the biometric reference template from the protected representation. In the system 100, the biometric reference template protected using the PQFC proved resistant not only to the classical attacker but also to quantum computing attacks. FIG. 8 shows that there is no correlation between the protected templates and the unprotected templates, and hence the system 100 satisfied the irreversibility.

D. Resistance to Smartcard Attack

Assuming that the smart card 102 is lost or stolen and that an attacker has obtained it, he will have access to the lattice-iris vector, $\Lambda_I$, stored on it. The attacker will have to use his biometric template $t_a$ with the lattice-iris vector $\Lambda_I$ to construct the biometric commitment, $\mathfrak{B}_a = \Lambda_I + q_{,2} t_a$. The matching score $\delta(\mathfrak{B}_r, \mathfrak{B}_a)$ exceeds the system threshold. It is obvious from FIG. 9 that the biometric-based PQFC authentication system 100 is resistant to smart card attacks.

E. Resistance to Hill-Climbing Attack

A hill-climbing attack was performed by an iteratively small modification to the input random biometric template and compared with unknown stored biometric features. The computed matching scores were higher than the system's threshold recorded. It was assumed that the attacker is able to obtain the biometric commitment in the biometric-based PQFC authentication system 100, and then he/she will not be able to compute the biometric commitment for his/her random input biometric template unless he/she is able to break the SVP. FIG. 9 shows that there is unlinkable between the distributions of the matching scores of the imposter-protected biometrics system using PQFC and unprotected biometric system, hence the system 100 is resistant to the hill-climbing attacks.

F. Accuracy Preservation

The accuracy performance of the protected biometric-based PQFC authentication system 100 was not reduced by the cryptographic technique. The biometric-based PQFC authentication system of the present disclosure provided improved accuracy performance as compared to the unprotected biometric system utilizing the same iris recognition algorithm and iris database.

The system 100 of the present disclosure employs a new post-quantum fuzzy commitment (PQFC) for biometric template protection. The PQFC was proven to be secure based on the hardness of the SVP problem of the lattice. Unlike traditional fuzzy commitment methods, the PQFC of the present disclosure does not rely on error-correcting codes. It is used to design a biometric-based PQFC authentication system.

The system 100 was evaluated using an iris database of 108 samples, with 7 eye images from each sample, and an existing iris recognition algorithm for template extraction. The findings of this study were that the accuracy of iris recognition was 99.1% with PQFC and 97.4% without PQFC. A False Accepting Rate (FAR) of 0% was achieved, while the False Rejection Rate (FRR) was 2.9%. The FRR can be adjusted by employing the best standard iris recognition algorithm.

The execution time for the essential operations of PQFC and the storage requirements were estimated. The biometric-based PQFC authentication system of the present disclosure fulfills the security properties: renewability, unlinkability, irreversibility, resistance to smartcard attacks, and accuracy preservation of the ISO/IEC 24745 standard for biometric template protection without downgrading the accuracy performance.

The biometric-based PQFC authentication system is suitable for any type of biometric trait in which there are enough data points to form a matrix.

The first embodiment is illustrated with respect to FIGS. 1-5. The first embodiment describes a method for biometric template protection. The method includes storing a biometric template on a smart card 102, and protecting the biometric template with a lattice-based post-quantum fuzzy commitment.

The method further includes a step of receiving a randomly generated matrix by the smart card 102 from an authentication server 112. The randomly generated matrix is given by:

$$A \in \mathbb{Z}_q^{n \times m},$$

where A represents m columns of n basis vectors, q is a prime number, n is an integer representing a number of columns in the matrix, and m is an integer representing a number of rows in the matrix.

The method further includes randomly generating a secret vector, $v \in \mathbb{Z}_q^m$ by the smart card 102.

The method further includes calculating a lattice vector, $\Lambda_I$, by the smart card 102. The lattice vector, $\Lambda_I$ is given by $\Lambda_I = A \times_q v$, where $\times_q$ represents matrix multiplication modulo q.

The method further includes receiving a biometric trait by the smart card 102.

The method further includes extracting, by the smart card 102, a biometric reference template, $t_r$, from the biometric trait.

The method further includes calculating a first post quantum fuzzy commitment, $B_r$, by the smart card 102. The post quantum fuzzy commitment, $B_r$, is given by: $B_r = \Lambda_I +_{q,2} t_r$, where $+_{q,2}$ represents q-modulo and 2-modulo vector addition.

The method further includes storing the lattice-iris vector, $\Lambda_I$, by the smart card 102, in a memory of the smart card.

The method further includes a step of transmitting the first post quantum fuzzy commitment, $B_r$, by the smart card 102 to the authentication server 112. The method further includes a step of storing, by the authentication server, the post quantum fuzzy commitment, $B_r$, in a database of the authentication server 112.

The method further includes a step of authenticating a transaction using the smart card 102, by: inserting the smart card 102 into a card reader; receiving, from a biometric probe 110, a biometric probe trait; extracting, by the smart card 102, a biometric probe template, $t_p$, from the biometric probe trait; calculating, by the smart card 102, a second post quantum fuzzy commitment, $B_p$, given by: $B_p = \Lambda_I +_{q,2} t_p$; transmitting, by the smart card 102, the second post quantum fuzzy commitment, $B_p$, to the authentication server; determining, by the authentication server 112, a matching score, $\delta_m$, by calculating a statistical distance between the second post quantum fuzzy commitment, $B_p$, and the first post quantum fuzzy commitment, $B_r$; comparing, by the authentication server 112, the matching score, $\delta_m$, to a threshold, $\sigma$; when the matching score, $\delta_m$, is less than or equal to the threshold, $\sigma$, authenticating the transaction; and when the matching score, $\delta_m$, is greater than the threshold, $\sigma$, declining the transaction. The method further includes a step of calculating the threshold, $\sigma$, based on $\sigma = \delta_m^2 / n \times 100\%$.

In an aspect, the biometric probe template, $t_p$, is deleted from the smart card 102 after calculating the second post quantum fuzzy commitment, $B_p$.

In an aspect, each biometric probe template, $t_p$, is unique.

In an aspect, the biometric probe 110 is a retinal scanner, the biometric template is an iris template, and the lattice vector is a lattice-iris vector.

In an aspect, the biometric probe 110 is a fingerprint scanner, the biometric template is a fingerprint template, and the lattice vector is a lattice-fingerprint vector.

In an aspect, the biometric probe 110 is a microphone, the biometric template is a voice template, and the lattice vector is a lattice-voice vector.

In an aspect, the biometric probe 110 is a facial scanner, the biometric template is a facial template, and the lattice vector is a lattice-facial vector.

In an aspect, the biometric probe 110 is a finger vein reader configured with an infrared light and combined with a camera, the biometric template is a finger vein pattern template, and the lattice vector is a lattice-finger vein pattern vector.

In an aspect, the biometric probe 110 is a palm reader configured with an infrared light and combined with a camera, the biometric template is a palm template, and the lattice vector is a lattice-palm vector.

The second embodiment is illustrated with respect to FIGS. 1-5. The second embodiment describes a smart card system 100. The system 100 includes at least one memory 104 located in a smart card 102, wherein the memory 104 is configured to store program instructions; a biometric probe 110 configured to record a biometric trait; a contact pad 106 located on the smart card 102, wherein the contact pad 106 is configured to interface with the biometric probe 110 to receive the biometric trait; a microprocessor 108 located in the smart card 102 and connected to the at least one memory 104, wherein the microprocessor 108 is configured to receive the biometric trait, wherein the microprocessor 108 is configured to execute the program instructions to extract a biometric reference template, $t_r$, from the biometric trait; store the biometric template, $t_r$, in the memory 104; and protect the biometric template with a lattice-based post-quantum fuzzy commitment.

The system 100 further includes an authentication server 112, wherein the authentication server 112 is configured to generate a random matrix, A, and transmit the random matrix to the smart card 102, wherein the random matrix is given by:

$$A \in \mathbb{Z}_q^{n \times m},$$

where A represents m columns of n basis vectors, q is a prime number, n is an integer representing a number of columns in the matrix, and m is an integer representing a number of rows in the matrix.

The microprocessor 108 is configured to execute the program instructions to receive the random matrix, A; randomly generate a secret vector, $v \in \mathbb{Z}_q^m$; calculate a lattice vector, $\Lambda_I$, given by $\Lambda_I = A \times_q v$, where $\times_q$ represents matrix multiplication modulo q; calculate a first post quantum fuzzy commitment, $B_r$, given by: $B_r = \Lambda_I +_{q,2} t_r$, where $+_{q,2}$ represents q-modulo and 2-modulo vector addition; store the lattice-iris vector, $\Lambda_I$, in the memory of the smart card 102; and transmit the first post quantum fuzzy commitment, $B_r$, to the authentication server 112; and delete the biometric template, $t_r$, from the memory.

In an aspect, the microprocessor 108 is configured to execute the program instructions to receive a biometric probe trait from the biometric probe 110, extract a biometric probe template, $t_p$, from the biometric probe trait, store the biometric probe template, $t_p$, in the memory 104, calculate a second post quantum fuzzy commitment, $B_p$, given by: $B_p = \Lambda_I +_{q,2} t_p$, transmit the second post quantum fuzzy commitment, $B_p$, to the authentication server 112, and delete the biometric probe template, $t_p$, from the memory 104.

In an aspect, the authentication server 112 is further configured to receive the second post quantum fuzzy commitment, $B_p$; determine a matching score, $\delta_m$, by calculating a statistical distance between the second post quantum fuzzy commitment, $B_p$, and the first post quantum fuzzy commitment, $B_r$; compare the matching score, $\delta_m$, to a threshold, $\sigma$; when the matching score, $\delta_m$, is less than or equal to the threshold, $\sigma$, authenticate the transaction; and when the matching score, $\delta_m$, is greater than the threshold, $\sigma$, decline the transaction.

The third embodiment is illustrated with respect to FIGS. 1-5. The third embodiment describes a non-transitory computer readable medium embodied within the smart card 102, the non-transitory computer readable medium having instructions stored therein that, when executed by one or more processors, cause the one or more processors to perform a method for biometric template protection. The method includes storing a biometric template, and protecting the biometric template with a lattice-based post-quantum fuzzy commitment.

The non-transitory computer readable medium method further includes receiving from an authentication server 112, a randomly generated matrix, A, given by: $A \in \mathbb{Z}_q^{n \times m}$, where $\mathbb{Z}$ represents m columns of n basis vectors, q is a prime number, n is an integer representing a number of columns in the matrix, and m is an integer representing a number of rows in the matrix; randomly generating a secret vector, $v \in \mathbb{Z}_q^m$; calculating a lattice vector, $\Lambda_I$, given by $\Lambda_I = A \times_q v$, where $\times_q$ represents matrix multiplication modulo q; receiving a biometric trait; extracting a biometric reference template, $t_r$, from the biometric trait; calculating a first post quantum fuzzy commitment, $B_r$, given by: $B_r = \Lambda_I +_{q,2} t_r$, where $+_{q,2}$ represents q-modulo and 2-modulo vector addition; storing the lattice-iris vector, $\Lambda_I$; transmitting the first post quantum fuzzy commitment, $B_r$, to the authentication server 112; authenticating a transaction by: inserting the smart card into a card reader; receiving, from a biometric probe, a biometric probe trait; extracting a biometric probe template, $t_p$, from the biometric probe trait; calculating a second post quantum fuzzy commitment, $B_p$, given by: $B_p = \Lambda_I +_{q,2} t_p$; transmitting the second post quantum fuzzy commitment, $B_p$, to the authentication server 112; receiving from the authentication server, an authentication of the transaction of the transaction when the second post quantum fuzzy commitment, $B_p$, matches the first post quantum fuzzy commitment, $B_r$; and receiving from the authentication server, a denial of the transaction of the transaction when the second post quantum fuzzy commitment, $B_p$, does not match the first post quantum fuzzy commitment, $B_r$.

Figure 10:
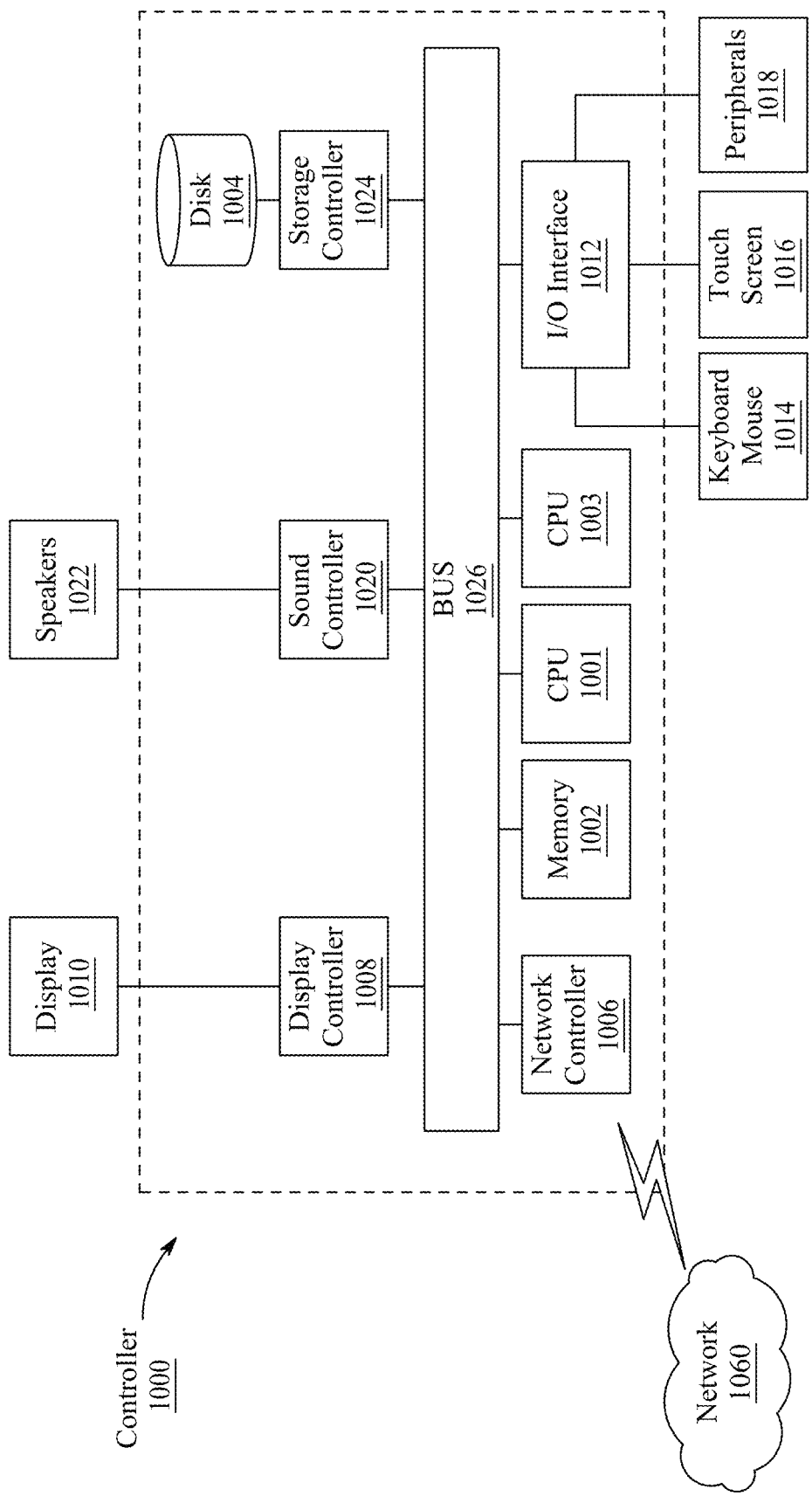
FIG. 10 is an illustration of a non-limiting example of details of computing hardware used in the computing system, according to certain embodiments.

Next, further details of the hardware description of the computing environment of FIG. 1 according to exemplary embodiments is described with reference to FIG. 10. In FIG. 10, a controller 1000 is described as representative of the system 100 of FIG. 1 in which the microprocessor 108 is a computing device that includes a CPU 1001 which performs the processes described above/below. The process data and instructions may be stored in memory 1002. These processes and instructions may also be stored on a storage medium disk 1004 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1001, 1003 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 1001 or CPU 1003 may be a Xenon or Core processor from Intel of America or an Opteron processor from AMD of America, or may be other processor types that would be recognized by one of ordinary skill in the art. Alternatively, the CPU 1001, 1003 may be implemented on an FPGA, ASIC, PLD or using discrete logic circuits, as one of ordinary skilled in the art would recognize. Further, CPU 1001, 1003 may be implemented as multiple processors cooperatively working in parallel to perform the instructions of the inventive processes described above.

The computing device in FIG. 10 also includes a network controller 1006, such as an Intel Ethernet PRO network interface card from Intel Corporation of America, for interfacing with network 1060. As can be appreciated, the network 1060 can be a public network, such as the Internet, or a private network such as an LAN or WAN network, or any combination thereof and can also include PSTN or ISDN sub-networks. The network 1060 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1008, such as a NVIDIA GeForce GTX or Quadro graphics adaptor from NVIDIA Corporation of America for interfacing with display 1010, such as a Hewlett Packard HPL2445w LCD monitor. A general purpose I/O interface 1012 interfaces with a keyboard and/or mouse 1014 as well as a touch screen panel 1016 on or separate from display 1010. General purpose I/O interface also connects to a variety of peripherals 1018 including printers and scanners, such as an OfficeJet or DeskJet from Hewlett Packard.

A sound controller 1020 is also provided in the computing device such as Sound Blaster X-Fi Titanium from Creative, to interface with speakers/microphone 1022 thereby providing sounds and/or music.

The general purpose storage controller 1024 connects the storage medium disk 1004 with communication bus 1026, which may be an ISA, EISA, VESA, PCI, or similar, for interconnecting all of the components of the computing device. A description of the general features and functionality of the display 1010, keyboard and/or mouse 1014, as well as the display controller 1008, storage controller 1024, network controller 1006, sound controller 1020, and general purpose I/O interface 1012 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown in FIG. 11.

Figure 11:
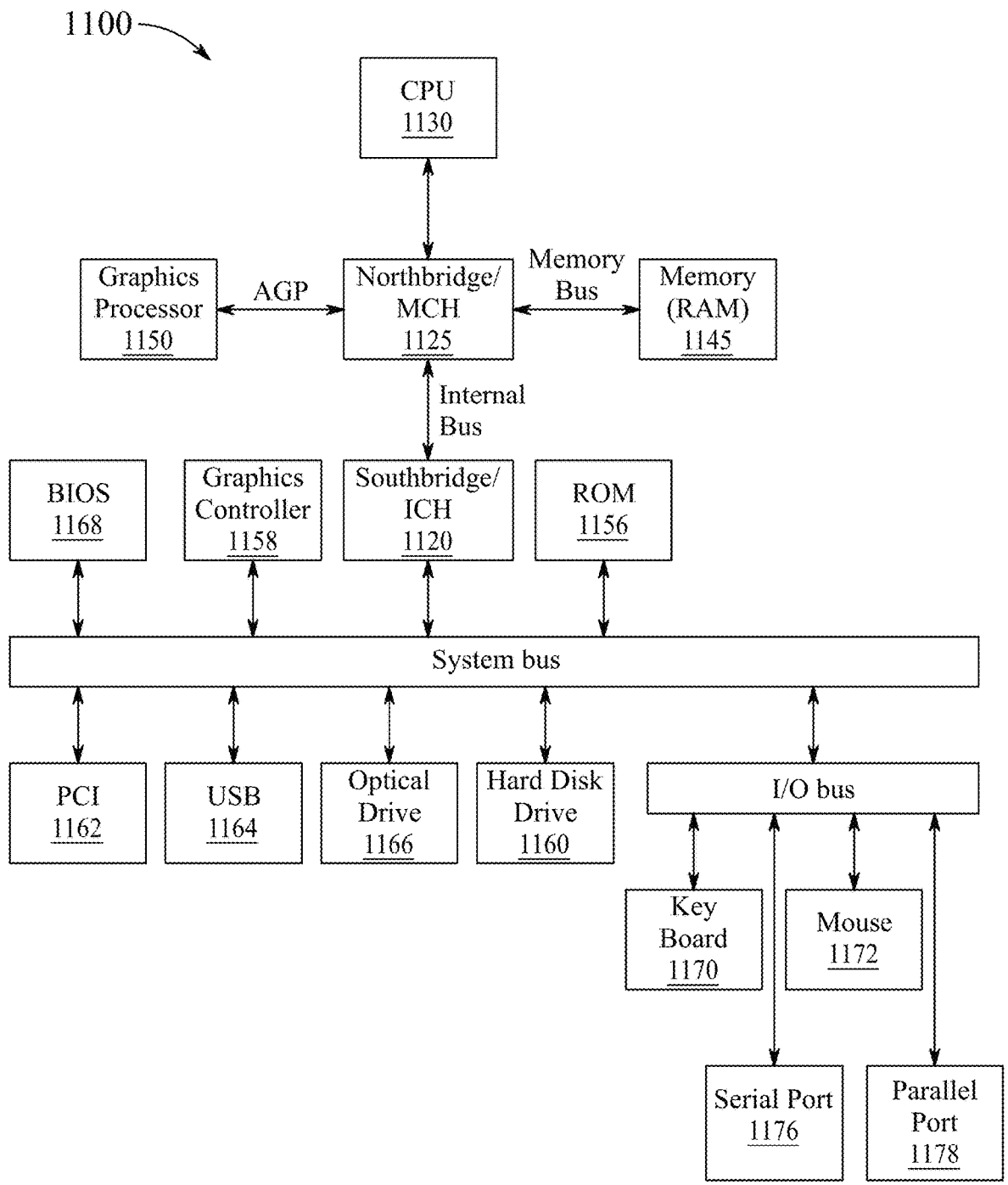
FIG. 11 is an exemplary schematic diagram of a data processing system used within the computing system, according to certain embodiments.

FIG. 11 shows a schematic diagram of a data processing system, according to certain embodiments, for performing the functions of the exemplary embodiments. The data processing system is an example of a computer in which code or instructions implementing the processes of the illustrative embodiments may be located.

In FIG. 11, data processing system 1100 employs a hub architecture including a north bridge and memory controller hub (NB/MCH) 1125 and a south bridge and input/output (I/O) controller hub (SB/ICH) 1120. The central processing unit (CPU) 1130 is connected to NB/MCH 1125. The NB/MCH 1125 also connects to the memory 1145 via a memory bus, and connects to the graphics processor 1150 via an accelerated graphics port (AGP). The NB/MCH 1125 also connects to the SB/ICH 1120 via an internal bus (e.g., a unified media interface or a direct media interface). The CPU Processing unit 1130 may contain one or more processors and even may be implemented using one or more heterogeneous processor systems.

Figure 12:
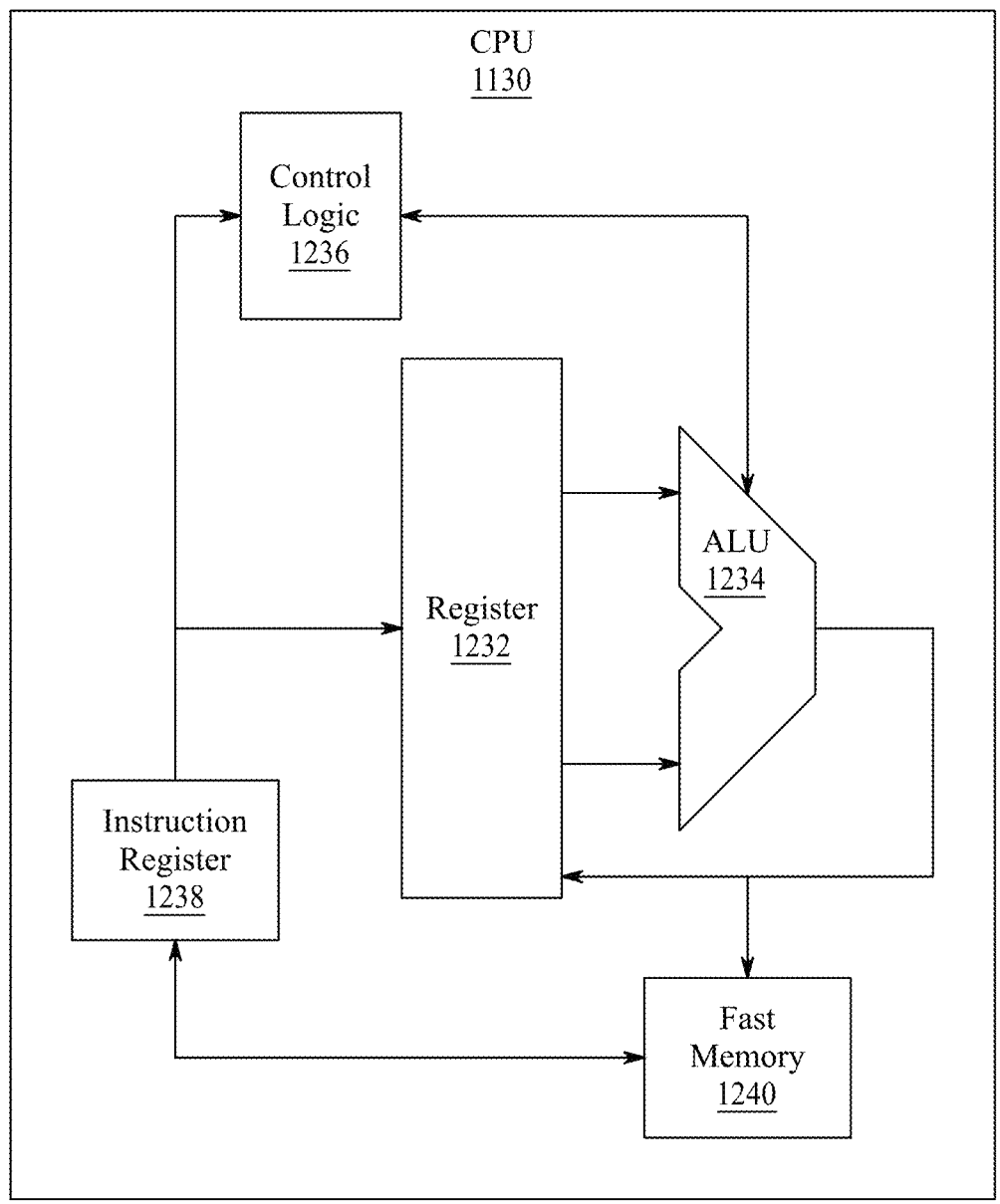
FIG. 12 is an exemplary schematic diagram of a processor used with the computing system, according to certain embodiments.

For example, FIG. 12 shows one implementation of CPU 1130. In one implementation, the instruction register 1038 retrieves instructions from the fast memory 1040. At least part of these instructions is fetched from the instruction register 1038 by the control logic 1036 and interpreted according to the instruction set architecture of the CPU 1130. Part of the instructions can also be directed to the register 1032. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1034 that loads values from the register 1032 and performs logical and mathematical operations on the loaded values according to the instructions. The results from these operations can be feedback into the register and/or stored in the fast memory 1040. According to certain implementations, the instruction set architecture of the CPU 1030 can use a reduced instruction set architecture, a complex instruction set architecture, a vector processor architecture, a very large instruction word architecture. Furthermore, the CPU 1130 can be based on the Von Neuman model or the Harvard model. The CPU 1130 can be a digital signal processor, an FPGA, an ASIC, a PLA, a PLD, or a CPLD. Further, the CPU 1130 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 11, the data processing system 1100 can include that the SB/ICH 1120 is coupled through a system bus to an I/O Bus, a read only memory (ROM) 856, universal serial bus (USB) port 1164, a flash binary input/output system (BIOS) 1168, and a graphics controller 1158. PCI/PCIe devices can also be coupled to SB/ICH 1188 through a PCI bus 1162.

The PCI devices may include, for example, Ethernet adapters, add-in cards, and PC cards for notebook computers. The Hard disk drive 1160 and CD-ROM 1166 can use, for example, an integrated drive electronics (IDE) or serial advanced technology attachment (SATA) interface. In one implementation the I/O bus can include a super I/O (SIO) device.

Further, the hard disk drive (HDD) 1160 and optical drive 1166 can also be coupled to the SB/ICH 1120 through a system bus. In one implementation, a keyboard 1170, a mouse 1172, a parallel port 1178, and a serial port 1176 can be connected to the system bus through the I/O bus. Other peripherals and devices that can be connected to the SB/ICH 1120 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended backup load to be powered.

Figure 13:
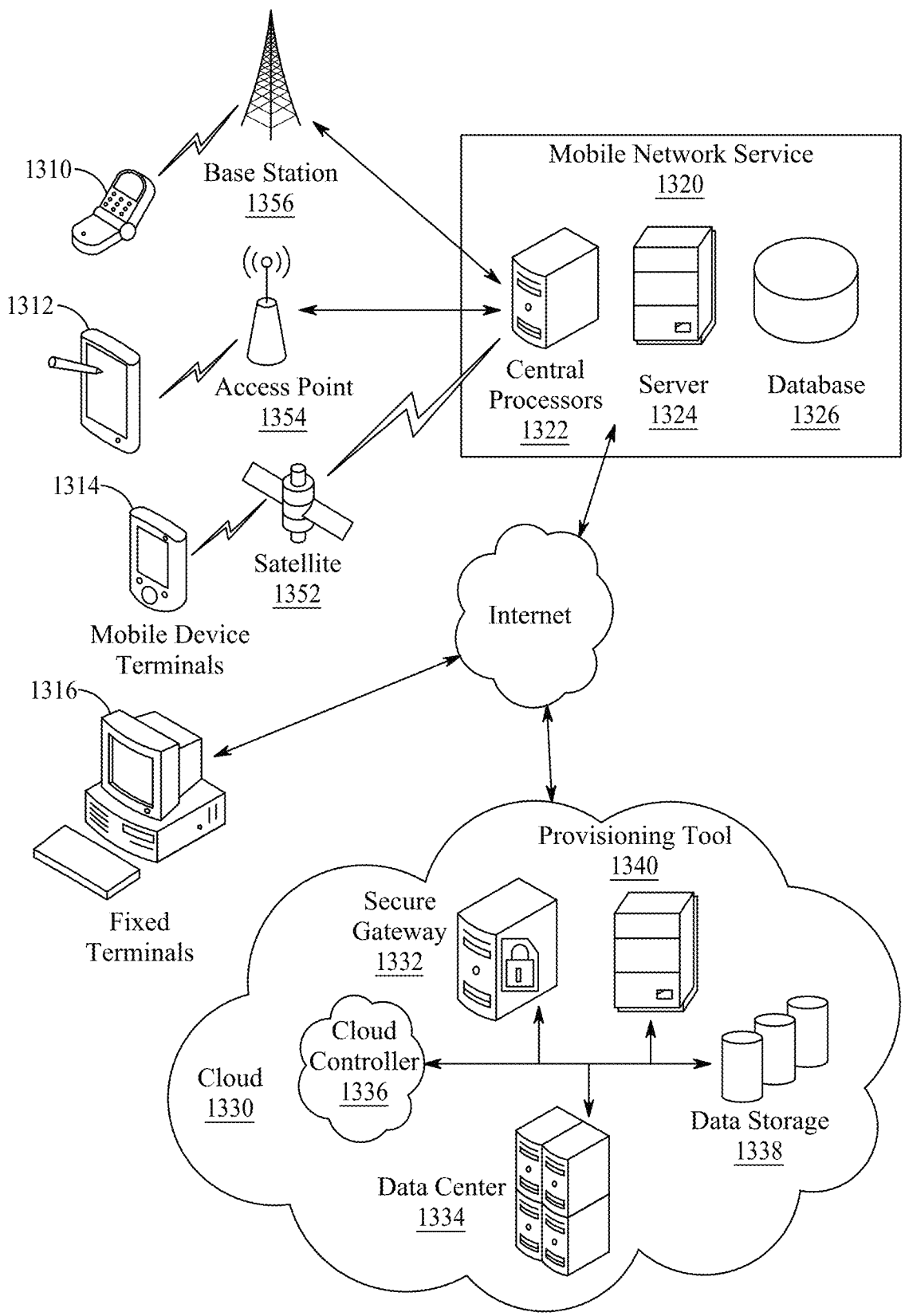
FIG. 13 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 13, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely, either in real-time or as a batch process. Additionally, some aspects of the present disclosures may be performed on modules or hardware not identical to those described. Accordingly, other aspects of the present disclosures are within the scope that may be claimed. More specifically, FIG. 13 illustrates client devices including smart phone 1311, tablet 1312, mobile device terminal 1314 and fixed terminals 1316. These client devices may be commutatively coupled with a mobile network service 1320 via base station 1356, access point 1354, satellite 1352 or via an internet connection. Mobile network service 1320 may comprise central processors 1322, server 1324 and database 1326. Fixed terminals 1316 and mobile network service 1320 may be commutatively coupled via an internet connection to functions in cloud 1330 that may comprise security gateway 1332, data center 1334, cloud controller 1336, data storage 1338 and provisioning tool 1340.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method for biometric template protection, comprising:
   storing a biometric template on a smart card;
   protecting the biometric template with a lattice-based post-quantum fuzzy commitment;
   receiving, by the smart card, from an authentication server, a randomly generated matrix, A, given by:

$A \in \mathbb{Z}_q^{n \times m}$, where A represents m columns of n basis vectors, q is a prime number, n is an integer representing a number of columns in the matrix, and m is an integer representing a number of rows in the matrix;
   randomly generating, by the smart card, a secret vector, $v \in \mathbb{Z}_q^m$;
   calculating, by the smart card, a lattice vector, $\Lambda_I$, given by $\Lambda_I = A \times_q v$, where $\times_q$ represents matrix multiplication modulo q;
   receiving, by the smart card, a biometric trait;
   extracting, by the smart card, a biometric reference template, $t_r$, from the biometric trait;
   calculating, by the smart card, a first post quantum fuzzy commitment, $B_r$, given by: $B_r = \Lambda_I +_{q,2} t_r$, where $+_{q,2}$ represents q-modulo and 2-modulo vector addition; and
   storing, by the smart card, the lattice-iris vector, $\Lambda_I$, in a memory of the smart card.

2. The method of claim 1, further comprising:
   transmitting, by the smart card, the first post quantum fuzzy commitment, $B_r$, to the authentication server;
   storing, by the authentication server, the first post quantum fuzzy commitment, $B_r$, in a database of the authentication server.

3. The method of claim 2, further comprising:
   authenticating a transaction using the smart card, by:
   inserting the smart card into a card reader;
   receiving, from a biometric probe, a biometric probe trait;
   extracting, by the smart card, a biometric probe template, $t_p$, from the biometric probe trait;
   calculating, by the smart card, a second post quantum fuzzy commitment, $B_p$, given by: $B_p = \Lambda_I +_{q,2} t_p$;
   transmitting, by the smart card, the second post quantum fuzzy commitment, $B_p$, to the authentication server;
   determining, by the authentication server, a matching score, $\delta_m$, by calculating a statistical distance between the second post quantum fuzzy commitment, $B_p$, and the first post quantum fuzzy commitment, $B_r$;
   comparing, by the authentication server, the matching score, $\delta_m$, to a threshold, $\sigma$;
   when the matching score, $\delta_m$, is less than or equal to the threshold, $\sigma$, authenticating the transaction; and
   when the matching score, $\delta_m$, is greater than the threshold, $\sigma$, declining the transaction.

4. The method of claim 3, further comprising:
   calculating the threshold, $\sigma$, based on $\sigma = \delta_m^2 / n \times 100\%$.

5. The method of claim 3, wherein the biometric probe template, $t_p$, is deleted from the smart card after calculating the second post quantum fuzzy commitment, $B_p$.

6. The method of claim 3, wherein each biometric probe template, $t_p$, is unique.

7. The method of claim 3, wherein the biometric probe is a retinal scanner, the biometric template is an iris template and the lattice vector is a lattice-iris vector.

8. The method of claim 3, wherein the biometric probe is a fingerprint scanner, the biometric template is a fingerprint template and the lattice vector is a lattice-fingerprint vector.

9. The method of claim 3, wherein the biometric probe is a microphone, the biometric template is a voice template and the lattice vector is a lattice-voice vector.

10. The method of claim 3, wherein biometric probe is a facial scanner, the biometric template is a facial template and the lattice vector is a lattice-facial vector.

11. The method of claim 3, wherein biometric probe is a finger vein reader configured with an infrared light and combined with a camera, the biometric template is a finger vein pattern template and the lattice vector is a lattice-finger vein pattern vector.

12. The method of claim 3, wherein biometric probe is a palm reader configured with an infrared light and combined with a camera, the biometric template is a palm template and the lattice vector is a lattice-palm vector.

13. A smart card system, comprising:
   at least one memory located in a smart card, wherein the memory is configured to store program instructions;
   a biometric probe configured to record a biometric trait;
   a contact pad located on the smart card, wherein the contact pad is configured to interface with the biometric probe to receive the biometric trait;
   a microprocessor located in the smart card and connected to the at least one memory, wherein the microprocessor is configured to receive the biometric trait, wherein the microprocessor is configured to execute the program instructions to:
      extract a biometric reference template, $t_r$, from the biometric trait;
      store the biometric template, $t_r$, in the memory; and
      protect the biometric template with a lattice-based post-quantum fuzzy commitment;
   an authentication server, wherein the authentication server is configured to generate a random matrix, A, and transmit the random matrix to the smart card, wherein the random matrix is given by:

$A \in \mathbb{Z}_q^{n \times m}$, where A represents m columns of n basis vectors, q is a prime number, n is an integer representing a number of columns in the matrix, and m is an integer representing a number of rows in the matrix;

wherein the microprocessor is configured to execute the program instructions to:

receive the random matrix, A;

randomly generate a secret vector, $v \in Z_q^m$;

calculate a lattice vector, $\Lambda_I$, given by $\Lambda_I = A \times_q v$, where $\times_q$ represents matrix multiplication modulo q;

calculate a first post quantum fuzzy commitment, $B_r$, given by: $B_r = \Lambda_I +_{q,2} t_r$, where $+_{q,2}$ represents q-modulo and 2-modulo vector addition;

store the lattice-iris vector, $\Lambda_I$, in a memory of the smart card; and transmit the first post quantum fuzzy commitment, $B_r$, to the authentication server; and delete the biometric template, $t_r$, from the memory.

14. The system of claim 13, wherein the microprocessor is configured to execute the program instructions to:

receive, from the biometric probe, a biometric probe trait;

extract a biometric probe template, $t_p$, from the biometric probe trait;

store the biometric probe template, $t_p$, in the memory;

calculate a second post quantum fuzzy commitment, $B_p$, given by: $B_p = \Lambda_I +_{q,2} t_p$;

transmit the second post quantum fuzzy commitment, $B_p$, to the authentication server; and delete the biometric probe template, $t_p$, from the memory.

15. The system of claim 14, wherein the authentication server is further configured to:

receive the second post quantum fuzzy commitment, $B_p$;

determine a matching score, $\delta_m$, by calculating a statistical distance between the second post quantum fuzzy commitment, $B_p$, and the first post quantum fuzzy commitment, $B_r$;

compare the matching score, $\delta_m$, to a threshold, $\sigma$;

when the matching score, $\delta_m$, is less than or equal to the threshold, $\sigma$, authenticate the transaction; and when the matching score, $\delta_m$, is greater than the threshold, $\sigma$, decline the transaction.

16. A non-transitory computer readable medium embodied within a smart card, the non-transitory computer readable medium having instructions stored therein that, when executed by one or more processors, cause the one or more processors to perform a method for biometric template protection, comprising:

storing a biometric template;

protecting the biometric template with a lattice-based post-quantum fuzzy commitment;

receiving from an authentication server, a randomly generated matrix, A, given by:

$A \in \mathbb{Z}_q^{n \times m}$, where A represents m columns of n basis vectors, q is a prime number, n is an integer representing a number of columns in the matrix, and m is an integer representing a number of rows in the matrix;

randomly generating a secret vector, $v \in Z_q^m$;

calculating a lattice vector, $\Lambda_I$, given by $\Lambda_I = A \times_q v$, where $\times_q$ represents matrix multiplication modulo q;

receiving a biometric trait;

extracting a biometric reference template, $t_r$, from the biometric trait;

calculating a first post quantum fuzzy commitment, $B_r$, given by: $B_r = \Lambda_I +_{q,2} t_r$, where $+_{q,2}$ represents q-modulo and 2-modulo vector addition;

storing the lattice-iris vector, $\Lambda_I$;

transmitting the first post quantum fuzzy commitment, $B_r$, to the authentication server;

authenticating a transaction by:

inserting the smart card into a card reader;

receiving, from a biometric probe, a biometric probe trait;

extracting a biometric probe template, $t_p$, from the biometric probe trait;

calculating a second post quantum fuzzy commitment, $B_p$, given by: $B_p = \Lambda_I +_{q,2} t_p$;

transmitting the second post quantum fuzzy commitment, $B_p$, to the authentication server;

receiving from the authentication server, an authentication of the transaction of the transaction when the second post quantum fuzzy commitment, $B_p$, matches the first post quantum fuzzy commitment, $B_r$; and receiving from the authentication server, a denial of the transaction of the transaction when the second post quantum fuzzy commitment, $B_p$, does not match the first post quantum fuzzy commitment, $B_r$.

\* \* \* \* \*